United States Patent
Kochi et al.

(10) Patent No.: US 7,010,157 B2
(45) Date of Patent: Mar. 7, 2006

(54) STEREO IMAGE MEASURING DEVICE

(75) Inventors: Nobuo Kochi, Tokyo (JP); Hitoshi Otani, Tokyo (JP); Tadayuki Ito, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 782 days.

(21) Appl. No.: 09/817,287

(22) Filed: Mar. 27, 2001

(65) Prior Publication Data
US 2002/0001406 A1    Jan. 3, 2002

(30) Foreign Application Priority Data

Mar. 30, 2000  (JP)  ............................. 2000-093398
Mar. 30, 2000  (JP)  ............................. 2000-093886

(51) Int. Cl.
*G06K 9/00*    (2006.01)
(52) U.S. Cl. ..................... 382/154; 382/216; 382/278; 356/12; 396/324
(58) Field of Classification Search ................ 382/154, 382/209, 215, 216, 278, 285, 291; 396/324–331
See application file for complete search history.

(56) References Cited

U.S. PATENT DOCUMENTS 5,943,442 A  *  8/1999  Tanaka et al. .............. 382/216
6,041,140 A      3/2000  Binns et al.
6,606,406 B1 *  8/2003  Zhang et al. ............... 382/154

FOREIGN PATENT DOCUMENTS

EP    0 880 010 A2   11/1998
EP    0 964 223 A1   12/1999

* cited by examiner

*Primary Examiner*—Samir Ahmed
*Assistant Examiner*—Charles Kim
(74) *Attorney, Agent, or Firm*—Foley & Lardner LLP

(57) ABSTRACT

The present invention discloses a stereo image measuring device capable of carrying out high-speed and highly reliable three-dimensional measurement for a stereo image, easily correcting any omitted measurement, measurement errors or the like, and achieving a much higher speed, efficiency and reliability for measurement as a whole. A survey instrument measures a number of control points on site. A camera is, for example a digital camera, a film camera or the like. A control point search unit executes correlation between a control point measured beforehand by the instrument survey and an image. A search area setting unit sets a search area to be used for image correlation processing based on the control points correlated by the control point search unit, and sets respective data blocks, i.e., a reference data block and a search data block. An arithmetic operation unit executes orientation calculation, and image correlation processing (stereo matching) for the search area set by the search area setting unit. A display unit is a stereo monitor, a personal computer monitor or the like providing stereoscopic vision. A measuring unit executes additional measurement when the result of correlation processing is not satisfactory.

10 Claims, 26 Drawing Sheets

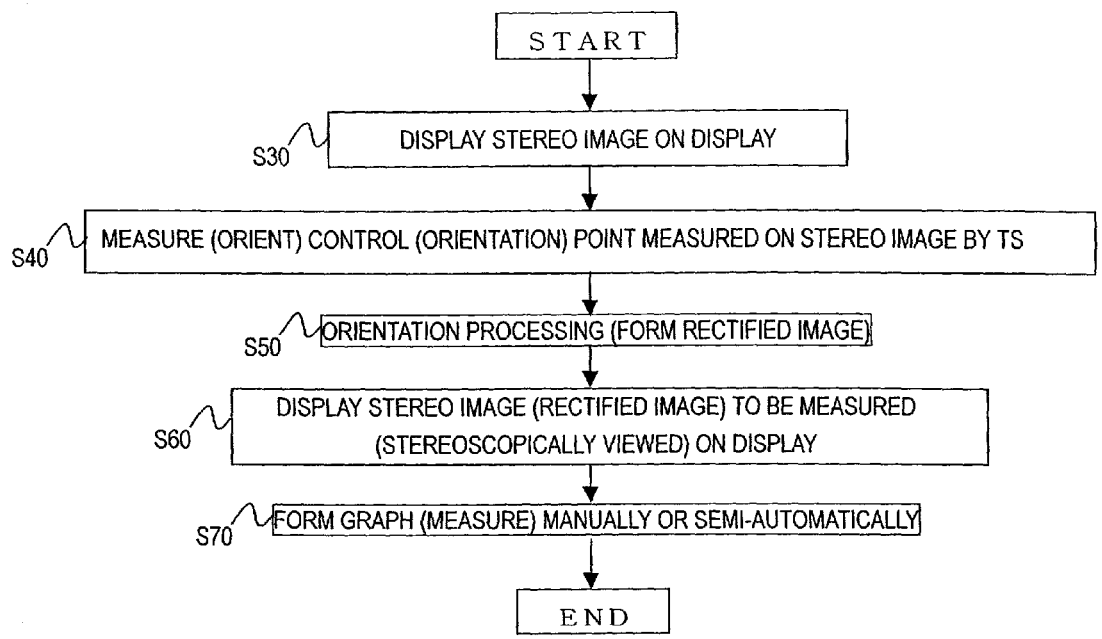
F I G 4

(a)

(b)

(a)

(b)

STEREO IMAGE MEASURING DEVICE

BACKGROUND OF THE INVENTION

The present invention relates to a stereo image measuring device and, more particularly, to a device for measuring a three-dimensional image from a stereo image. Throughout the specification, "off-line measurement" means executions of image photographing, for example, at a measuring site, and of operations other than the photographing at a different calculation and analyzing site. On the other hand, "on-line measurement" means executions of image measuring, and also of displaying of a three-dimensional image, for example, at a measuring site.

In the conventional art of digital photogrammetry, three-dimensional measurement and analysis from an obtained digital image have been carried out in the following manner. First, orientation is carried out based on several imprinted control points to provide stereoscopic vision. Then, stereo matching is carried out from a plurality of obtained images to calculate a three-dimensional coordinate, and thus a three-dimensional image is analyzed. In the stereo matching in particular, a coarse-to-fine image correlation processing method or the like is used in order to surely obtain three-dimensional data. Here, according to the coarse-to-fine image correlation processing method, correlation processing is carried out in stages gradually from a low-resolution image to a high-resolution image, rather than executing correlation processing among high-resolution images from the beginning. This method reduces the number of local errors, thereby enhancing reliability (see Image Analysis Handbook, p. 709, compiled under the supervision of M. Takagi, and Y. Shimoda). The three-dimensional measurement has also been carried out by utilizing a survey instrument such as a total station, a GPS or the like.

In addition, to measure a relatively large object in the form of a three-dimensional image in the conventional art, the points of measurement have been scanned by use of the survey instrument such as a total station, or the points of measurement have been increased by moving the GPS, and thus the three-dimensional image has been displayed by a collection of a number of small surfaces surrounded with the plurality of points of measurement. Another method has also been available, that is, three-dimensional measurement has been carried out by executing image correlation processing (stereo matching) or the like from a photographed stereo image, and then displaying a three-dimensional image as a collection of a number of surface shapes.

SUMMARY OF THE INVENTION

However, in such a conventional method, image correlation processing must be carried out even for each image having different resolution, thus necessitating a great deal of time for its arithmetic operation. In the conventional case, if a measuring error occurs, the operation of repeating the image correlation processing must be carried out by specifying the place of the measuring error again by an operator, thereby necessitating much labor and time for measurement and correction. Also, conventionally, when the tree-dimensional measurement and analysis are needed at a natural disaster site or a place requiring emergency attendance or the like, there may be such cases where enough time may not be provided for measurement by the total station or the like at the actual site, measurement may be impossible, only photographs of the place may be taken, and the like.

Especially with regard to the case of using the total station (TS), the conventional art has presented a method for obtaining three-dimensional data by automatically scanning the points of measurement by use of an auto-tracking total station (reflectorless TS). This reflectorless TS is a total station, which needs no reflectors such as prisms or the like. However, this method necessitates a great deal of time for measurement, because the measurement is carried out while driving the TS by a motor. For example, assuming that measurement of one point takes 1 sec., about 11 hours are necessary only for measuring 200×200 points. Other problems have included the impossibility of measurement caused by the unreturning of a ranging light, a larger reduction in accuracy as a ranging beam is farther, and so on.

To move the GPS as in the case of the conventional art, much labor and time must be expended because of the measurement of a measurement point coordinate while moving a platform for loading the GPS. The need to move the GPS to a point to be measured has also made it impossible to perform measurement at a dangerous place.

In the case of the GPS, problems regarding the measurement carried out by photographing from a stereo image has included the necessity of setting a control point (point of orientation) on an object to be measured, the impossibility of determining without orientation whether the photographed stereo image is measured or not, a longer calculation time for stereo matching (image correlation processing), the impossibility of measuring characterless places, and so on. In particular, to assure the execution of image correlation processing, a method called coarse-to-fine image correlation has been employed. According to this method, correlation processing is carried out in stages gradually from a low-resolution image to a high-resolution image, rather than executing correlation processing among high-resolution images from the beginning. Thus, the number of local errors is reduced, enhancing reliability (see Image Analysis Handbook, p 709, compiled under the supervision of M. Takagi, and Y. Shimoda). In the case of this method, however, image correlation processing must be carried out even for each image having different resolution, necessitating a great deal of time for an arithmetic operation.

Furthermore, in the case of measurement carried out by a stereo camera having a base line fixed, such an advantage is provided that a control point is unnecessary. However, there have been problems inherent, which include limitation on the angle of view (range of measurement), the necessity of a connection point (control point) for image connection caused by the increase of the range of measurement.

The present invention was made with foregoing problems in mind, and it is an object of the invention to provide a measuring device capable of executing high-speed and highly reliable three-dimensional measurement for a stereo image, and easily correcting any omitted measurement, measurement errors or the like. It is another object of the invention to provide a measuring device capable of executing highly reliable and high-speed three-dimensional measurement and analysis only by measuring several control points and photographing a stereo image even in a site requiring emergency attendance because of natural disaster or the like, or when quick on-site measurement is necessary or when measurement is difficult.

It is another object of the invention to achieve high reliability and speeding up of analysis processing by enabling efficient execution of image correlation processing. It is also an object of the invention to carry out high-speed three-dimensional measurement in non-contact even in an area conventionally impossible to be measured, such as a place too dangerous to enter or the like.

It is a further object of the invention to achieve, especially in the case of on-line measurement, much higher speed, efficiency and high reliability of entire measurements compared with the case where single measurement is carried out by each method.

In order to achieve the foregoing object, according to the invention, especially in the case of off-line measurement, a stereo image measuring device is provided, comprising: a setting unit for setting, regarding a stereo image including at least three or more points of measurement having position data thereof obtained, at least a part of the points of measurement as division points, and then setting a search area based on at least three selected from a plurality of the set division points; an arithmetic operation unit for executing correlation processing for images of search areas corresponding to each other on the stereo image based on the search area set by the setting unit; and a measuring unit for measuring a coordinate of a point in a given position from a result of the correlation executed by the arithmetic operation unit.

In order to achieve the foregoing object, according to the invention, especially in the case of on-line measurement, a stereo image measuring device is provided, comprising: a setting unit for setting, regarding a stereo image including at least three or more points of measurement having position data thereof obtained, at least a part of the points of measurement as division points, and then setting a search area based on at least three selected from a plurality of the set division points; an arithmetic operation unit for executing correlation processing for images of search areas corresponding to each other on the stereo image based on the search area set by the setting unit; and a measuring unit for measuring a coordinate of a point in a given position based on a result of the correlation executed by the arithmetic operation unit, where the arithmetic operation unit prepares information regarding an area of measurement which requires a new point of measurement, according to the result of the correlation processing.

Mainly in the case of on-line measurement, the invention has, for example, the following features in order to achieve the foregoing object. By executing these processing below, it is possible to carry out measurement at a higher speed and with higher reliability than those in the conventional case.

1. Photographing of a stereo image of an area to be measured.
2. Measurement of six or more control (orientation) points in an area included in both stereo images by a reflectorless TS.
3. Measurement (orientation) of control (orientation) points measured by TS on the stereo image.
4. Decision of an area to be subjected to image correlation processing based on points of measurement.
5. Execution of image correlation processing for an area.
6. Displaying, on a display, of an image formed based on three-dimensional coordinates obtained from a correlation coefficient or the result of correlation processing of step 5.

Further, mainly in the case of on-line measurement, the invention has the following features. The addition of these processings enables measurement to be executed at a much higher speed and with much higher reliability. If the reliability of measurement is considered to be insufficient, the following operations 7 to 10 may be repeated until satisfactory reliability is provided.

7. Execution of additional measurement for an area having a low correlation coefficient, or a place where an image formed based on measurement data is not satisfactory.
8. Re-decision of an area to be subjected to image correlation processing based on a point of measurement.
9. Execution of image correlation processing for an area.
10. Displaying, on a display, of an image formed from the result of correlation.

Furthermore, according to the invention, mainly in the on-line measurement, for an area that cannot be measured by the reflectorless TS, and not measured well even by image correlation processing, calculation can be executed by interpolating an elevation value from information on the measurement area of the reflectorless TS. The advantages of such processing are as follows:

Since the three-dimensional measurement value of the reflectorless TS can be set as an initial value for stereo matching, coarse-to-fine image correlation processing can be omitted, making it possible to shorten the time of calculation.

The combination measurement using a stereo image and the reflectorless TS enables the total time of measurement to be much faster than that in single measurement using one of TS and a stereo image.

A place where image measurement is difficult (e.g., characterless) can be measured by the reflectorless TS, or conversely, a place where no light returns for the reflectorless TS can be measured by an image. Thus, both measuring difficult places can be interpolated.

For an area of bad image correlation, interpolation is performed by the measurement of the reflectorless TS and, further, by setting its measurement value as an initial value, the area of measurement can be finer and more proper, thus enhancing reliability.

Since on-site measurement is enabled, and measurement can be carried out while verifying an error area, the reliability of measurement can be enhanced, eliminating failures.

BRIEF DESCRIPTION OF THE DRAWINGS

FIG. 4 is a flowchart of pre-processing.

DETAILED DESCRIPTION OF THE PREFERRED EMBODIMENTS

Next, description will be made of the preferred embodiments of the present invention with reference to the accompanying drawings.

A: Hardware

Figure 1:
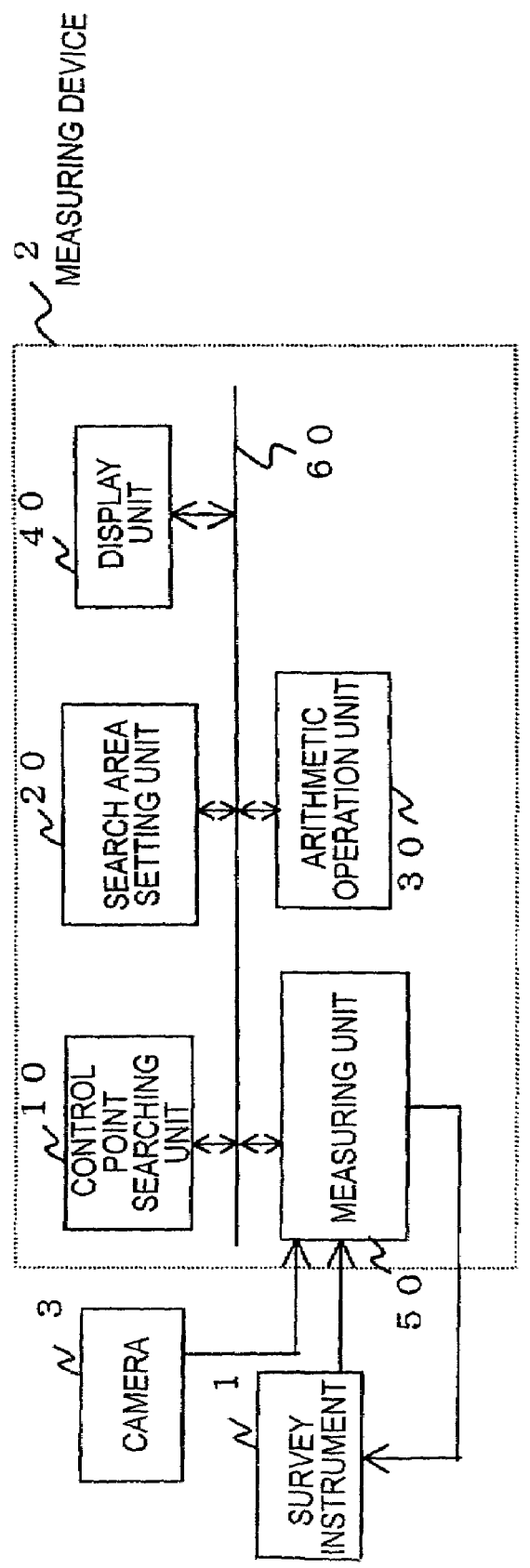
FIG. 1 is a block diagram of an entire measuring device according to the present invention.

FIG. 1 is a block diagram showing the entire measuring device of the invention.

This system comprises a survey instrument 1, a measuring device 2, and a camera 3. The measuring device 2 includes a control point searching unit 10, a search area setting unit 20, an arithmetic operation unit 30, a display unit 40, a measuring unit 50, and a bus 60. These components, i.e., the control point searching unit 10, the search area setting unit 20, the arithmetic operation unit 30, the display unit 40 and the measuring unit 50 are loaded on, for example a personal computer, and interconnected through the bus 60.

The survey instrument 1 is used to measure several control points on site. This instrument is not necessary when measurement is performed by obtaining a stereo image having several control points contained therein beforehand. The camera 3 is used to obtain an image, and one can be selected for use from, for example a digital camera, a film camera, and so on. It is not always necessary to prepare the camera 3. Instead, an image having several control points imprinted therein beforehand may be obtained and analyzed.

The control point searching unit 10 correlates a control point measured beforehand by the survey instrument 1, with an image. The search area setting unit 20 sets, based on the control point correlated by the control point searching unit 10, a search area for image correlation processing, and reference data and search data blocks. The arithmetic operation unit 30 executes orientation calculation and image correlation processing (stereo matching) for the search area set by the search area setting unit 20. The display unit 40 is a stereo monitor for providing stereoscopic vision, a personal computer monitor or the like. The use of such a stereo monitor enables more specific and accurate three-dimensional measurement to be performed, and the measurement result to be verified. The display unit 40 displays, in a graphic manner, a photographed stereo image, a correlation coefficient value obtained from the result of correlation processing, a point and a contour line formed based on three-dimensional coordinates obtained from the result of correlation processing, a bird's-eye view, a digital ortho-image, and so on. The method using the display unit 40 to execute graphic displaying, verification or additional measurement can be used for, for example, proper visual determination of the result of measurement, an object having not so high correlation coefficient reliability and the like. The graphic displaying can be executed in real time.

The measuring unit 50 executes additional measurement when the result of correlation processing is undesirable. For the additional measurement by the measuring unit 50, such a method may be used, where correlation coefficients are displayed and then additional measurement is executed for a portion having little correlation. Another possible method may be used, which displays in a graphic manner a point and a contour line based on three-dimensional coordinates of each point, a wire frame model, a surface model having a stuck surface, a bird's-eye view or a digital ortho-image made to have a stuck image, or the like, and then executes additional measurement for the defective point of the displayed image. Regarding the method of displaying correlation coefficients on a screen to execute image verification or correction, one may be selected for use from the following methods: displaying the area of a low correlation coefficient and executing manual or semi-automatic measurement correction based on the screen; using correlation coefficients, and executing automatic measurement for an area of a specified threshold or lower; and so on.

B: Off-Line Measurement

Next, description will be made of "off-line measurement" included in the operation of the stereo image measuring device of the invention.

Then manual or semi-automatic measurement, and automatic measurement will be described in detail.

B-1. On-Site Work

Figure 2:
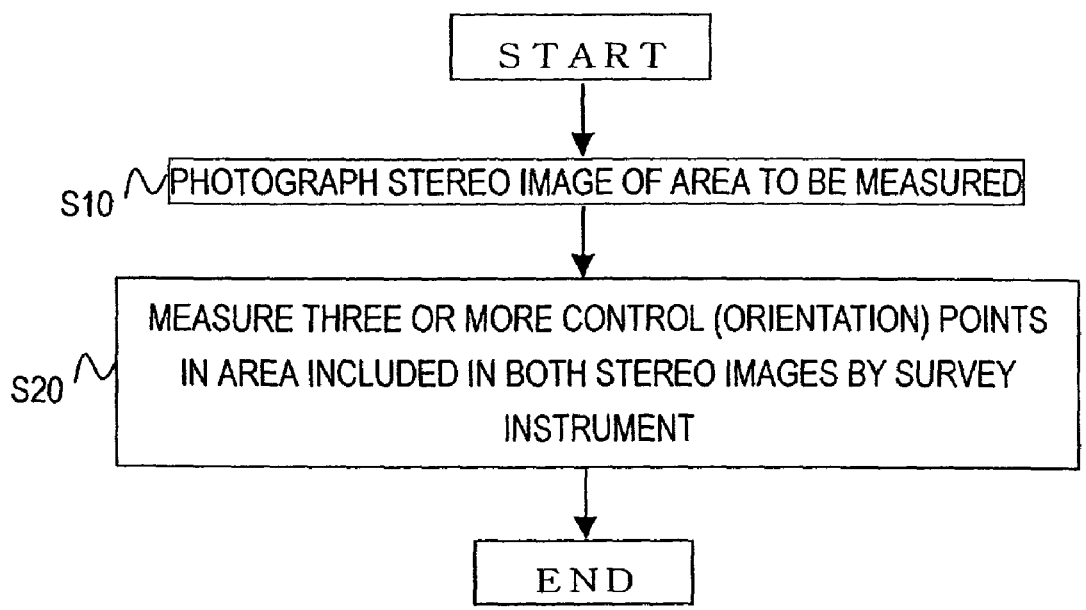
FIG. 2 is a flowchart of on-site work.

First, on-site work is explained. FIG. 2 is a flowchart of on-site work. If measurement is started on a site, the steps of this flowchart are carried out as on-site work. If a stereo image having a control point contained therein has already been obtained, these steps are not necessary.

Figure 3:
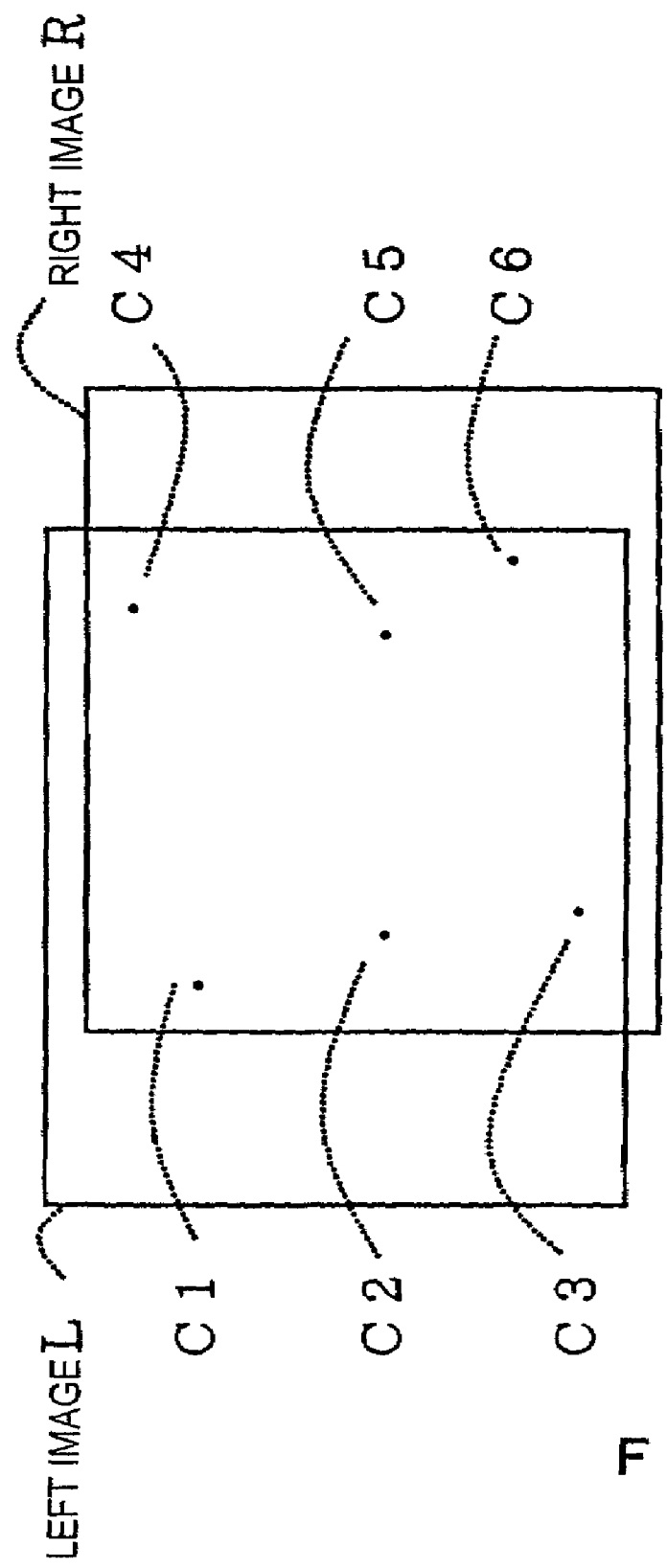
FIG. 3 is a view illustrating a stereo image.

In step S10, first, the stereo image of an area to be measured on the site is photographed. FIG. 3 illustrates a stereo image. As shown, two overlapped stereo images (left image L, and right image R) are photographed. Then, in step S20, at the survey instrument 1, three or more control (orientation) points are photographed in an area included in both of the stereo-photographed left and right images. The number of control points may be 3 or more. However, if the number of control points is 6 or more, orientation processing (see later step S40) will be more stable, enhancing the reliability of analysis carried out later. Thus, here, 6 points will be taken as an example. Specifically, in the area having the left and right images overlapped in FIG. 3, 6 points, i.e., C1 to C6 are set to be control (orientation) points, and measured by the survey instrument 1. Then, stereo image data and a control point coordinate value measured by the survey instrument are transferred to a place, e.g., an office, where the stereo image measuring device is installed. These data can be transmitted by use of a memory medium for storing an image or through a telephone line or the like.

B-2. Pre-Processing

FIG. 4 is a flowchart of pre-processing. After the entry of the image data and the control point coordinate value into the stereo image measuring device, the pre-processing like shown in the drawing is executed.

First, in step S30, the transferred stereo image is displayed on the display of the display unit 40, and this image is then verified by an operator. In step S40, on the left and right images displayed at the display unit 40, the control (orientation) points measured by the survey instrument 1 are subjected to measurement (correlation). In other words, in this example, the points C1 to C6 that have been measured by the survey instrument 1 are then subjected to orientation respectively on the left and right images L and R. In step S50, orientation processing is executed based on the control points measured in step S40, and a rectified image is formed. In other words, an image to be stereoscopically viewed (measured) having vertical parallax eliminated is formed. In step S60, the stereo image to be stereoscopically viewed (measured), formed in step S50, is then displayed on the display of the display unit 40.

In step S70, the operator executes measurement (formation of a graph) for a place particularly intended to be measured (formed into a graph), a boundary line, a place having a level difference or the like by use of a pointing device, e.g., a mouse, while watching the display. This measurement work (graph formation) is carried out based on a stereoscopic vision if a stereo monitor is available. Alternatively, the left and right images may be respectively displayed on the monitor of the personal computer and the points of correspondence in both left and right images may then be pointed (and measured). Otherwise, by means of semi-automatic correlation processing or the like, a place indicated on the left image may be subjected to automatic correlation processing on the right image, and thereby a corresponding point may be searched and indicated. The use of such processing may greatly facilitate measurement (graph formation) work. This measurement work (graph formation) does not always have to be carried out in the above step. However, such execution enables measurement to be carried out with higher reliability, and correction work to be reduced accordingly.

B-3. Basic Measurement Flow

Figure 5:
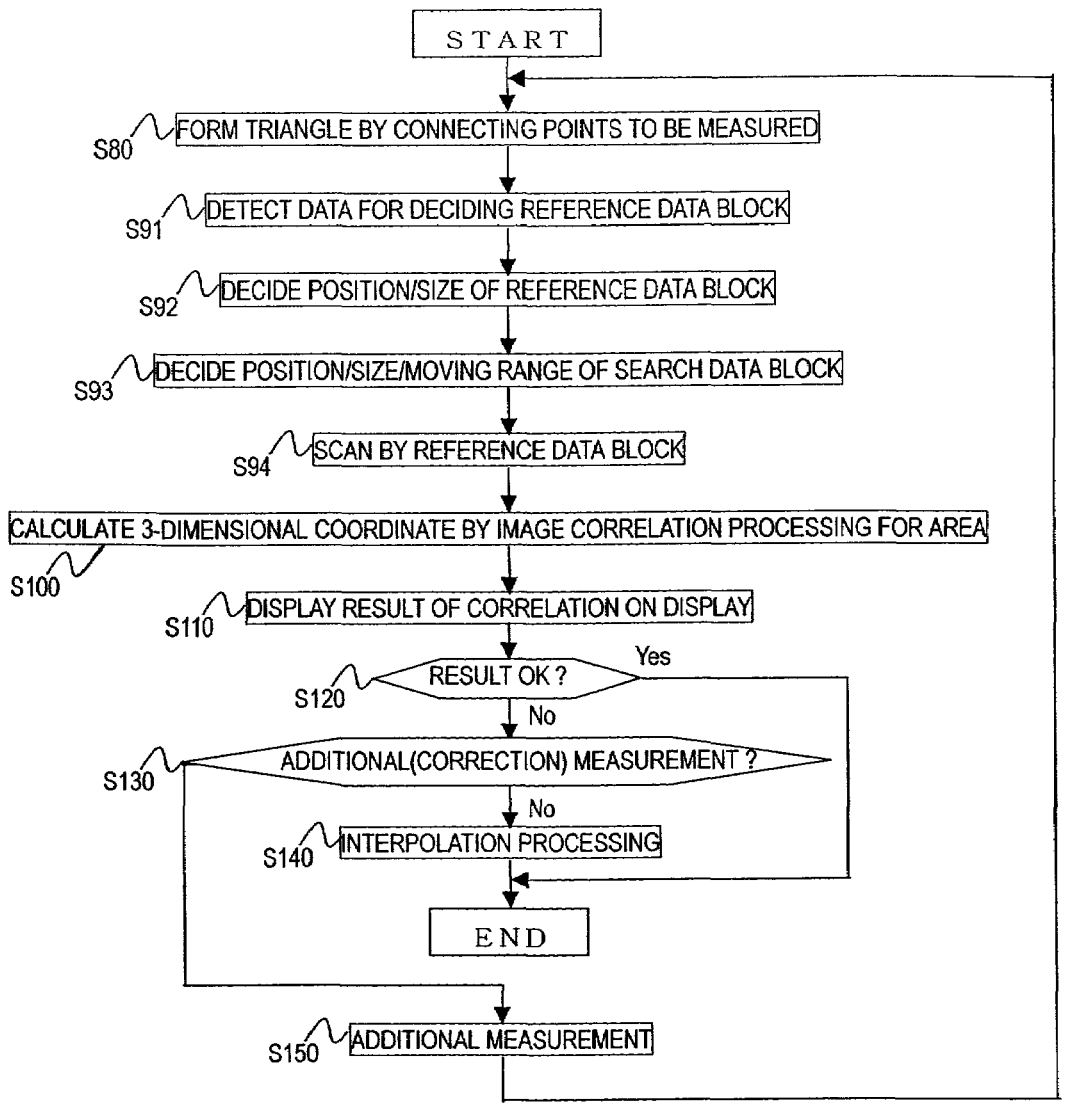
FIG. 5 is a flowchart of off-line measurement.

FIG. 5 is a flowchart of off-line measurement. The process from step S80 to S110 is automatically carried out by computer processing irrespective of manual or semi-automatic measurement.

Figure 6:
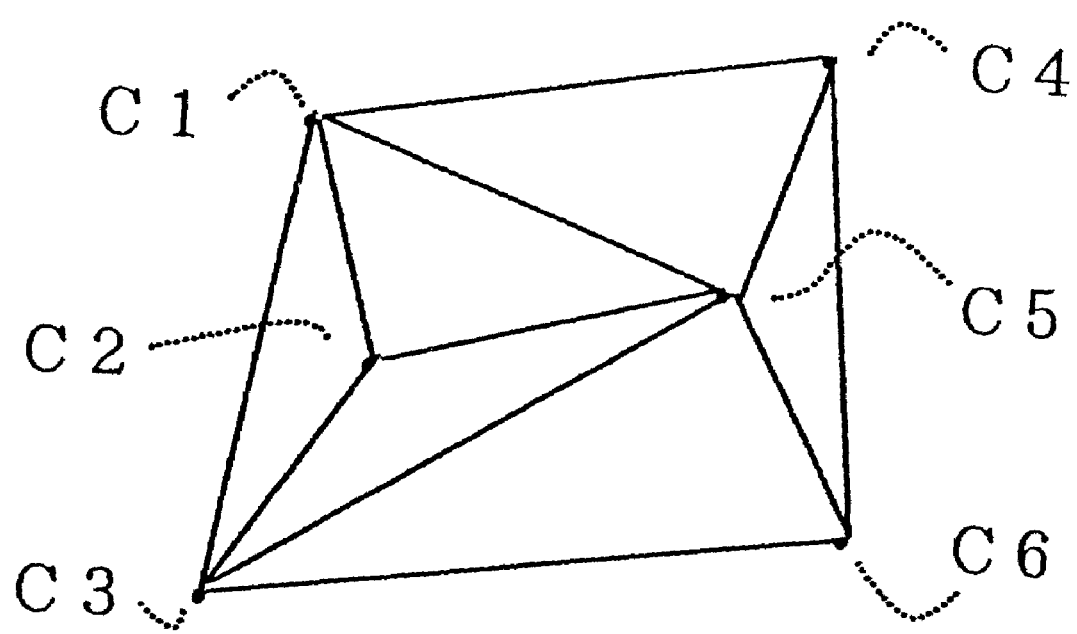
FIG. 6 is a view illustrating formation of a triangle based on a point of measurement.

In step S80, the points of measurement measured in step S40 or S70 are interconnected to form a triangle. FIG. 6 illustrates the formation of such a triangle based on the points of measurement. This example shows a case where the points selected from the points of measurement C1 to C6 are interconnected to form a triangle. In this case, the points may also be interconnected to form not a triangle but a square. However, since a triangular shape enables the inside of an area to be divided much more finely than a square (two planes can be formed by 4 points in the case of the triangle, while only one plane is formed in the case of the square), accuracy and reliability can be enhanced. As a method for interpolating a three-dimensional coordinate by such random points, triangulated irregular network (TIN) can be used. The TIN is designed to form a mesh composed of a triangle. For details on the TIN, see "Computational Geometry and Geographical Information Processing", p 127, by M, Iri, and T, Koshizuka, "Voronoi View, Introduction to one basic geometrical data structure" ACM Computing Surveys, Vol. 23, pp 345 to 405, by Franz Aurenhammer, translated by A, Sugihara, or the like.

In step S91, the control point searching unit 10 detects data regarding a reference data block (template) from one of the images, e.g., the left image. For example, this data is regarded as a triangle formed by 3 division points, and a square including the triangle, or the like. In step S92, the position or the size of the template is decided based on a distance from each of the division points of the template or the like. In step S93, from the template of the left image measured on the image, a search area for executing image correlation processing is decided by the search area setting unit 20. In step S94, the search area decided for the other image, e.g., the right image is subjected to scanning by use of the template of the left image. Setting of the template and scanning of the search area will be described later.

Subsequently, in step S100, for each divided area, image correlation processing between the template and the search area is executed at the arithmetic operation unit 30. Specifically, the corresponding point of the right image which corresponds to the left image is obtained (or the corresponding point of the left image which corresponds to the right image) by obtaining one having large correlation, and thereby a three-dimensional coordinate thereof is calculated. Regarding the image correlation processing (stereo matching), a residual sequential testing method (SSDA method), a mutual correlation coefficient method or the like can be used.

Hereinbelow, the mutual correlation coefficient method suited to automatic measurement is explained.

(Method Based on Mutual Correlation Coefficient)

Figure 7:
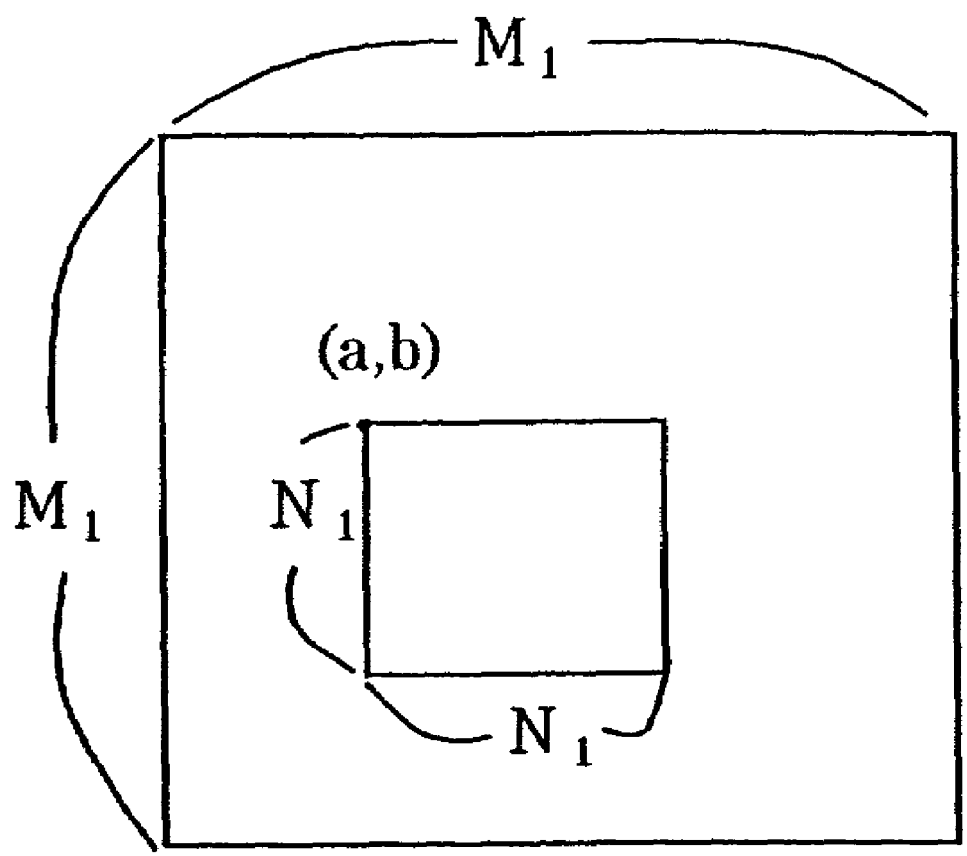
FIG. 7 is a view illustrating an input image and a template image.

FIG. 7 illustrates an input image and a template image. As shown, it is assumed that searching has been carried out for the template image by moving the template image of $N_1 \times N_1$ pixels within a searching range $(M_1-N_1+1)^2$ in the input image of $M_1 \times M_1$ pixels, which is larger than the template image, and obtaining the left upper position of the template image so as to have a largest correlation coefficient r represented by an expression below.

Figure 8:
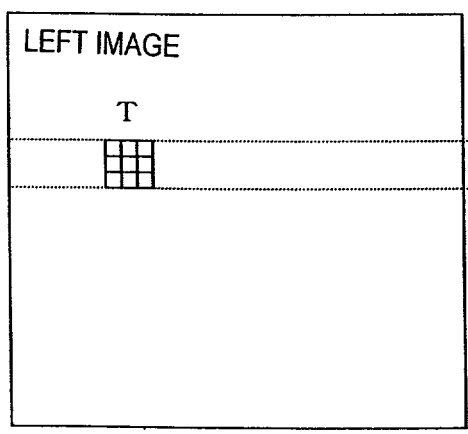
FIG. 8 is a view showing an example of 3×3 pixels.
Figure 8:
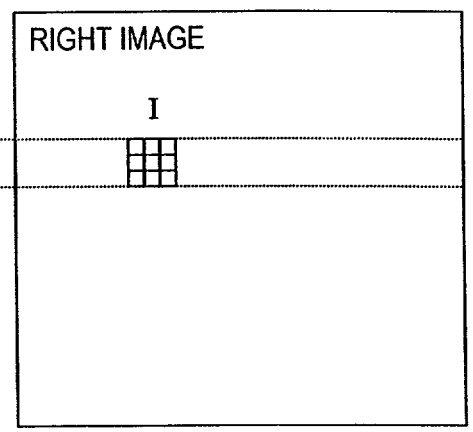

FIG. 8 shows an example of 3×3 pixels. In this example, a comparison image 1 having a correlation value equal to or larger than that of the template image T of the left image is searched on the same line (epipolar line) from the right image. In other words, the foregoing expression is calculated in a corresponding relation to each image. Then, by shifting such images one by one or by a specified number, one having a high correlation value is obtained.

$$r = \frac{\text{COVARIANCE OF TEMPLATE IMAGE AND COMPARISON IMAGE}}{\sqrt{\text{DISPERSION OF TEMPLATE IMAGE } T_\sigma} \sqrt{\text{DISPERSION OF COMPARISON IMAGE } I_{\sigma_{ab}}}} \quad (1)$$

$$= \frac{S_{TI}}{S_T \cdot S_I}$$

$$S_{TI} = \frac{1}{N} \sum_{i=1}^{N} (T_i - \overline{T})(I_i - \overline{I}) \quad (2)$$

$$S_T^2 = \frac{1}{N} \sum_{i=1}^{N} (T_i - \overline{T})^2 \quad (3)$$

$$S_I^2 = \frac{1}{N} \sum_{i=1}^{N} (I_i - \overline{I})^2 \quad (4)$$

$I_i$: DENSITY LEVEL OF COMPARISON IMAGE
$T_i$: DENSITY LEVEL OF TEMPLATE IMAGE
$\overline{T}, \overline{I}$ AVERAGE VALUE According to the invention, as an example, the reference data block is set as a template image from the left image, searching is executed by use of a search data block in the search area of the right image as a unit, and then a search data block as a portion of the right image matching the reference data block (template) of the left image is searched. The matching portion is a point having a largest correlation coefficient (approaching 1).

Figure 9:
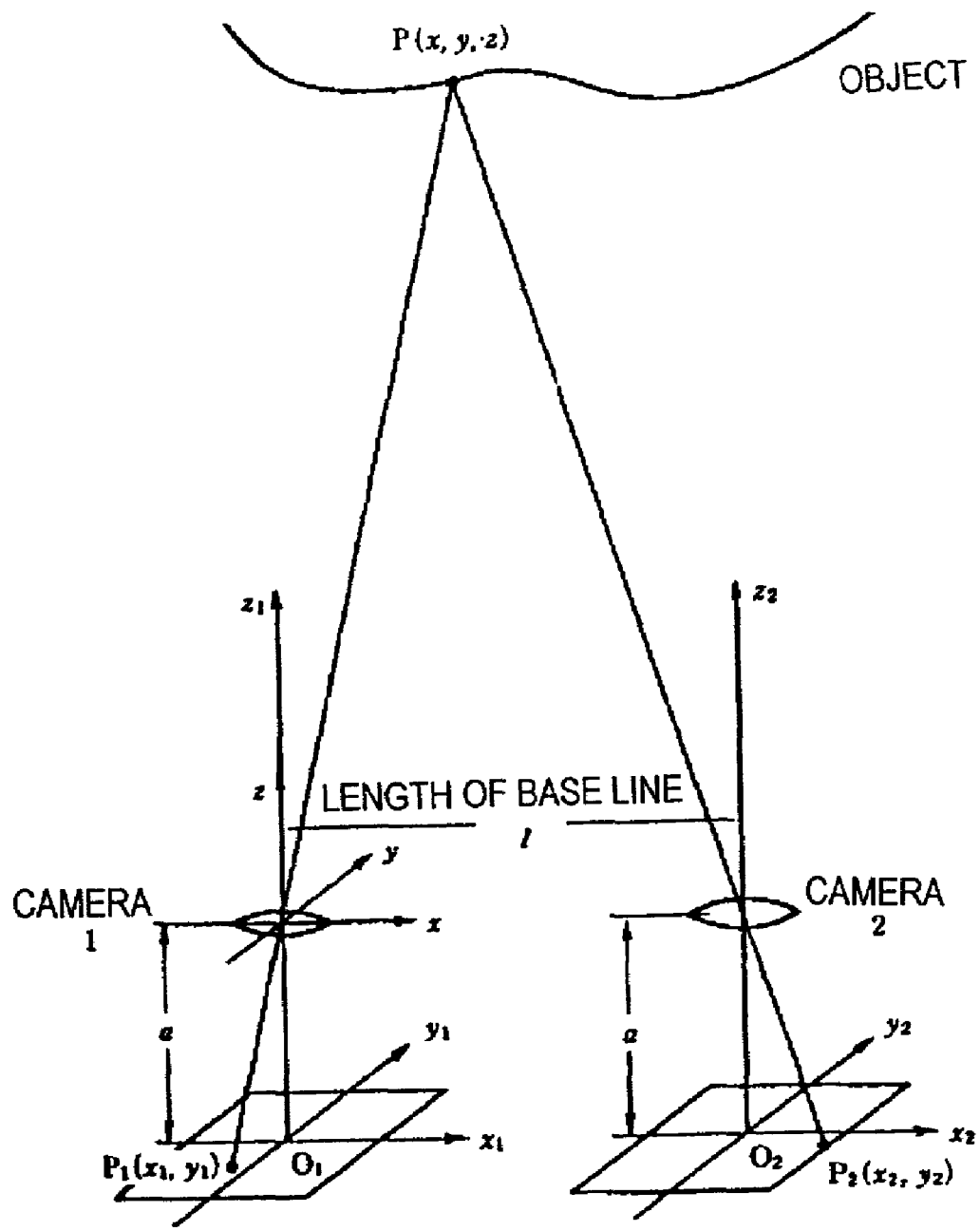
FIG. 9 is a view illustrating a stereo method.

After the corresponding points of the left and right images have been obtained by the foregoing correlation processing, a three-dimensional coordinate value of each point of measurement is calculated based on the principle of a stereo method. FIG. 9 illustrates such a stereo method.

(Stereo Method)

For simplicity, it is assumed that two cameras are used, the optical axes thereof are parallel to each other, distances "a" from the principal points of camera lenses to CCD surfaces are equal to each other, and each CCD is placed perpendicularly to the optical axis.

A distance (length of base line) between the two optical axes is set as L.

The following relation is established between the coordinates of points $P_1(x_1, y_1)$ and $P_2(x_2, y_2)$ on an object:

$$x_1 = ax/z \quad \text{①} \tag{5}$$
$$y_1 = y_2 = ay/z \quad \text{②}$$
$$x_2 - x_1 = aL/z \quad \text{③}$$

Here, the origin of the entire coordinate system (x, y, z) is set as the lens principal point of the camera 1. If an image photographed by the camera 1 is set as a left image, and one by the camera 2 is set as a right image, the position of $x_2$ (point having highest similarity) with respect to the position of the left image $x_1$ is obtained by the image correlation processing. Accordingly, z is obtained from the expression ③ and, by use of this value, x and y are obtained from the expressions ① and ②.

The measurement is explained by referring back to the flowchart. In step S110, the obtained result of correlation between the left and right images is displayed on the display unit 40. In this case, a largest correlation coefficient (point of highest similarity) found as a result of searching the search data block is set as a similarity in the data block, and the result of the correlation is displayed on the image.

Figure 10:
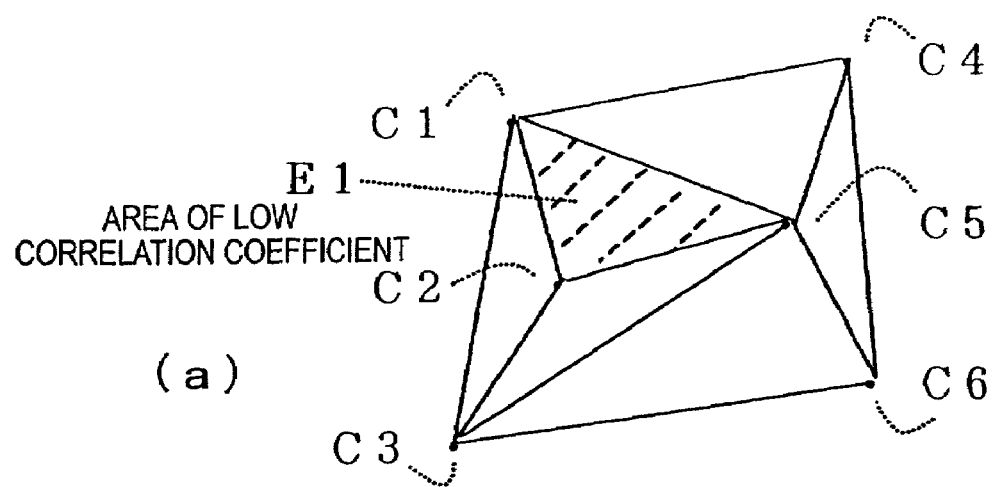
FIGS. 10(a) and 10(b) are views, each thereof illustrating displaying of a result of correlation.
Figure 10:
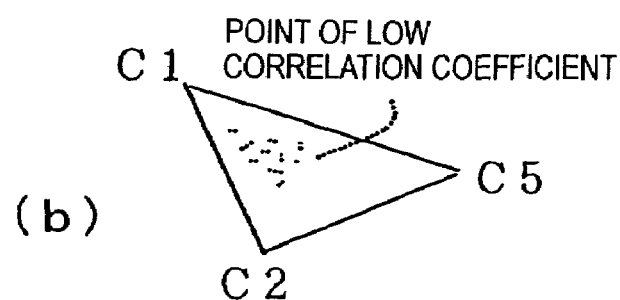

FIGS. 10(a) and FIG. 10(b) are views, each thereof illustrating the displaying of the result of correlation. For example, as shown in the E1 area of FIG. 10(a) and in FIG. 10(b), if there is an area or a point having a low correlation coefficient, such an area or point is highlighted. For the displaying method, actual correlation coefficient values may be displayed by use of different colors or the like, or displayed by providing plural stages of thresholds. In step S120, the process is finished if the result of displaying is satisfactory.

Figure 11:
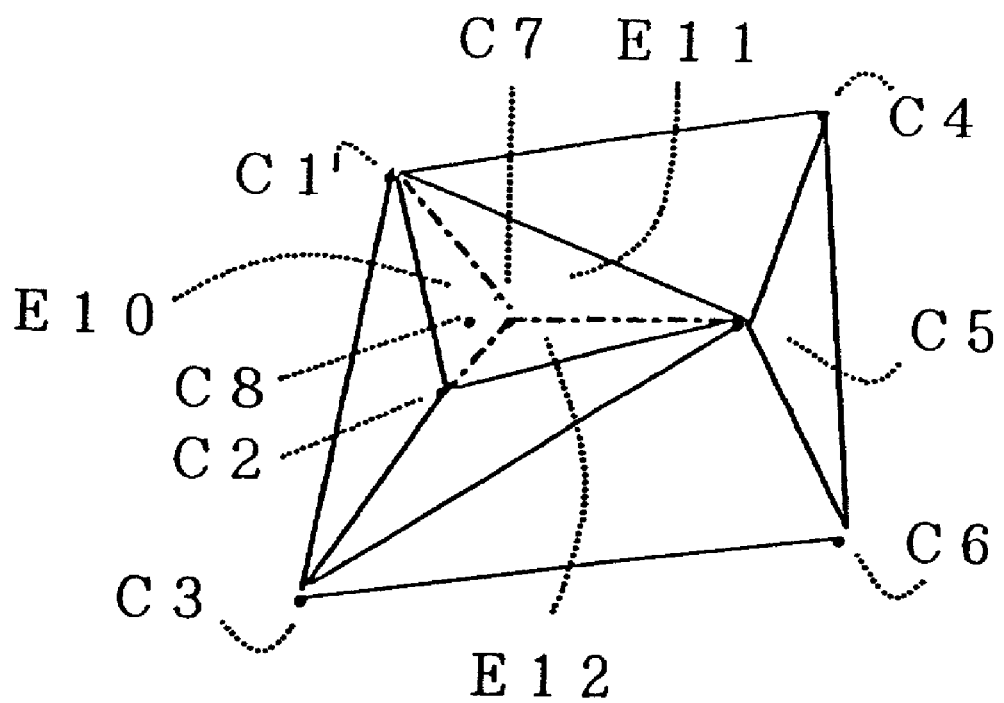
FIG. 11 is a view illustrating an additional point of measurement.

Next, an additional measurement flow will be described. In step S130, if the result of displaying is not satisfactory, the process proceeds to step S150. In step S150, for the area of the unsatisfactory correlation result, the unsatisfactory portion is additionally measured in a manual or a semi-automatic manner, or points of measurement are selected from the result of correlation. Here, since the state is off-line, the data that has already been measured by the survey instrument 1 is used in the additional measurement. For example, for a point in the area E1 of a low correlation coefficient shown in FIG. 10(a), specification is made manually or semi-automatically by use of the pointing device such as a mouse or the like while watching the stereo monitor or the monitor of the personal computer, and additional measurement is executed for the specified area. In the additional measurement, a graph may be formed (measurement may be made) at points, or with lines such as boundary lines depending on an object. According to another method, regarding points in the area E1 of a low correlation coefficient shown in FIG. 10(a), if there is a relatively correct point of measurement having a high correlation coefficient, this point may be selected on the display and set as an additional point of measurement. In addition, if there is a point not used as a control point, among the points measured by the survey instrument, then such a point may be selected as a point of measurement. For example, FIG. 11 illustrates such an additional point of measurement. In the drawing, C7 denotes an added point of measurement. As a result, areas E10, E11 and E12 are added. Alternatively, both of the foregoing two methods may be employed. Further, even for an area having not so bad a correlation coefficient, if the result of correlation verified by the display unit 40 is not correct, the foregoing work may be carried out for this area. Such work assures more accurate measurement.

Then, the process proceeds to step S80. In step S80, the points of measurement that have been additionally measured are added to form a triangle. FIG. 11 shows the addition of such a point of measurement. Specifically, the reconnection of the points of measurement is carried out by use of the additional point C7 shown in FIG. 11. In this case, a more detailed triangle may be formed for the additional point as shown, or triangles may be formed all over again irrespective of the previous connection points.

Figure 12:
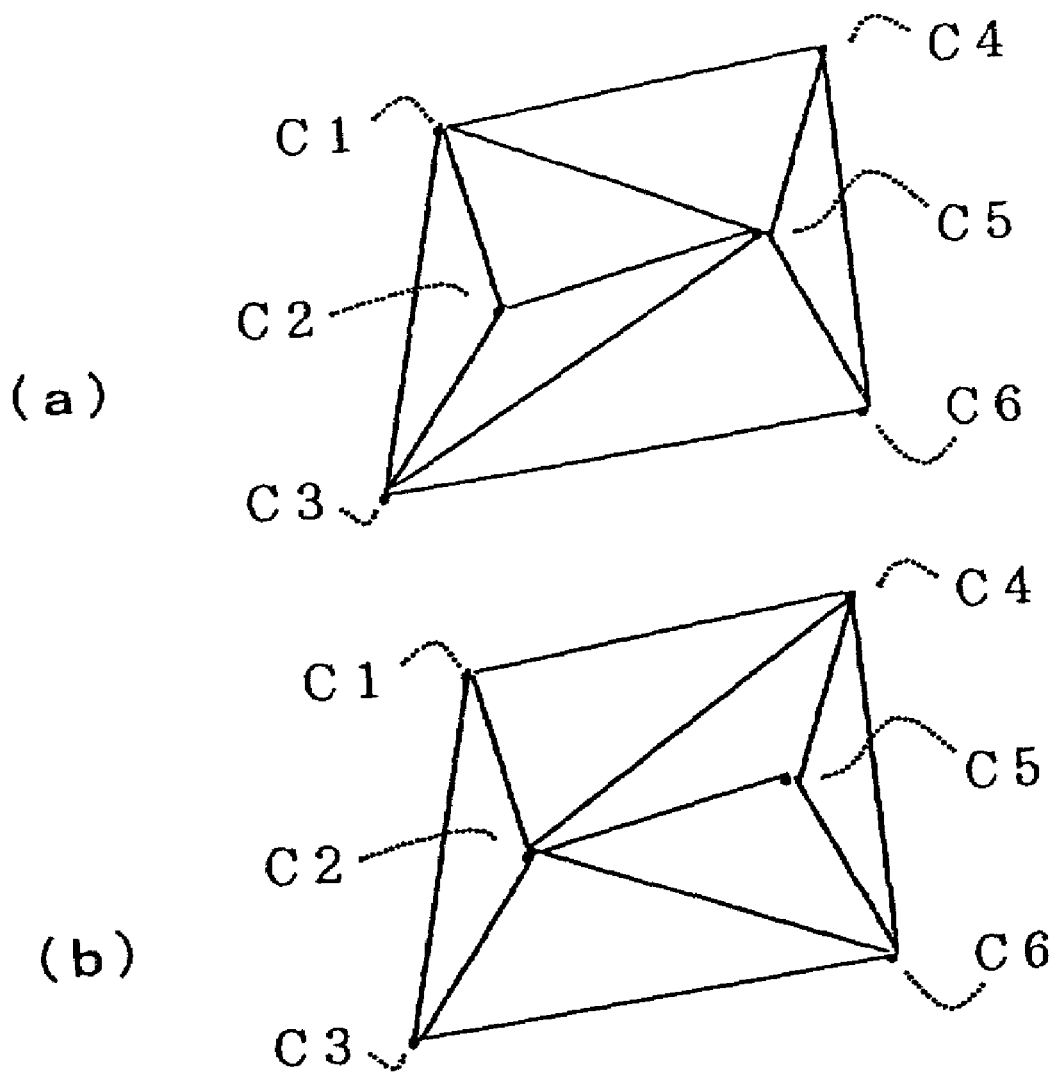
FIGS. 12(a) and 12(b) are views, each thereof illustrating a triangle recombination.

In step S150, if no additional measurement is carried out or no points to be selected are present, the triangles are recombined. FIGS. 12(a) and 12(b) are views, each thereof illustrating the recombination of triangles. For example, if there are triangles formed like those shown in FIG. 12(a), then the triangles can be recombined as in the case of FIG. 12(b). In addition, if the points linearly measured in step S150 are additionally selected, then a finer triangular shape can be formed with those points, enhancing both reliability and a density.

Subsequently, as in the case of the foregoing, processing of each step after step S91 is carried out, and then in step S100, image correlation processing is executed for a new area. In this case, if a detailed triangle is formed, only a newly added triangle area is subjected to image correlation processing. In step S110, the result of correlation is displayed on the display unit. In step S120, if the result is satisfactory, the process is finished. In step S130, if the displayed result is not satisfactory, the process proceeds to the additional measurement again. In step S150, additional measurement is carried out for another area intended to be additionally measured while watching the monitor. The process thereafter is similar to that in above-mentioned step S80 and after, and repeated until a satisfactory result is obtained.

Assuming that no improvement is made even by any additional measurements, or no additional measurement is carried out, then the process proceeds to step S140. In step S140, for example if results are always unsatisfactory taken by any means for the area E10 of FIG. 11, an elevation value is interpolated based on the plane equation of the plane E10 composed of the points of measurement C1, C2 and C7. As an example, to obtain C8 in the area E10, if the coordinates of C8 are $(x_8, y_8, z_8)$, then the elevation value $z_8$ of C8 is calculated in the following manner:

$$z_8 = -(ax_8 + by_8 + d)/c \tag{6}$$

(Coefficients a, b, c and d are calculated from the tree-dimensional coordinates of C1, C2 and C7).

B-4. Automatic Measurement

Figure 13:
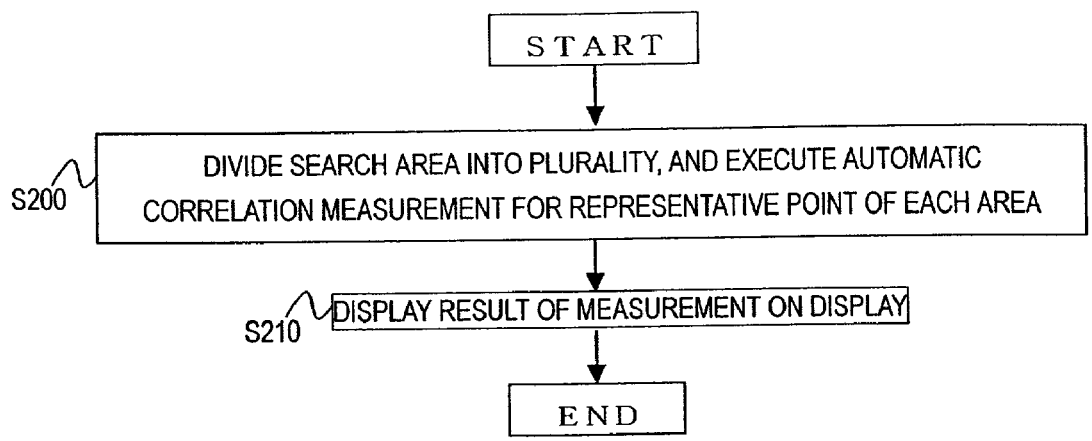
FIG. 13 is a flowchart of automatic measurement of three-dimensional coordinates for a representative point.
Figure 14:
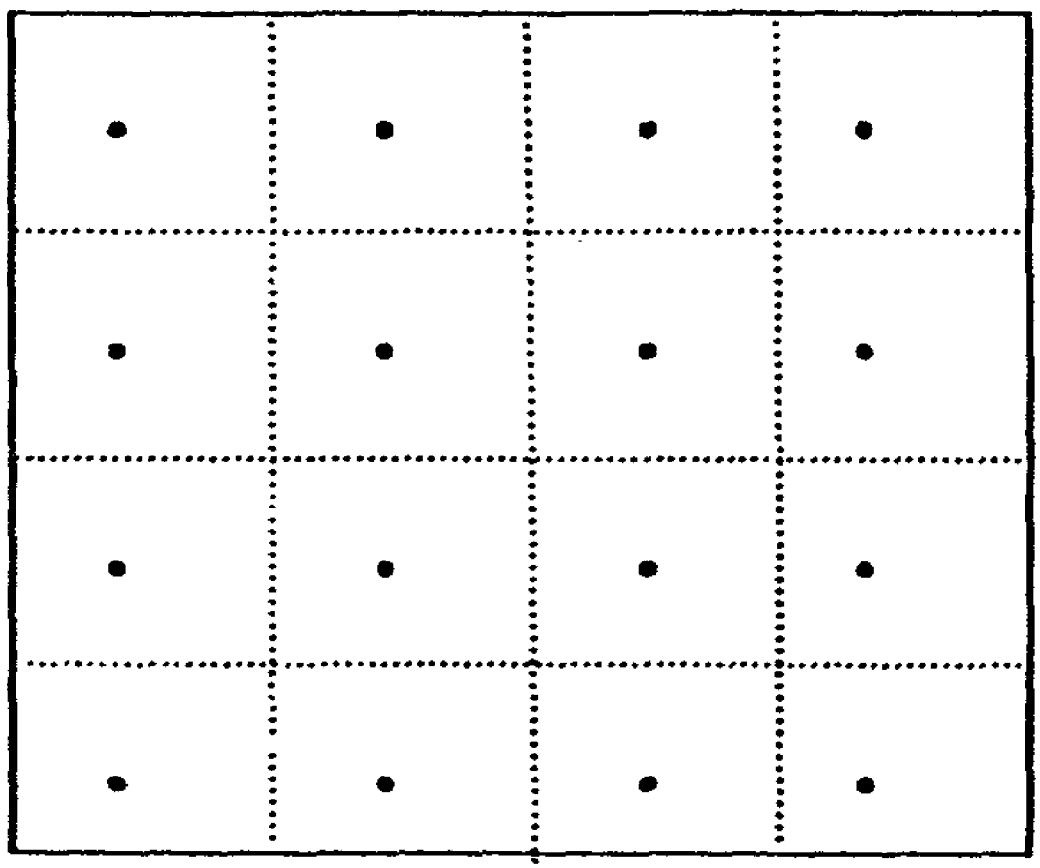
FIG. 14 is a view illustrating representative points to be automatically measured.

Next, description will be made of automatic measurement. FIG. 13 is a flowchart of automatic measurement carried out for a representative point on a three-dimensional coordinate. FIG. 14 is a view illustrating a representative point to be automatically measured. To perform on-site measurement, the process similar to that of FIG. 2 is carried out, and the pre-processing thereof is similar to that of the flow shown in FIG. 4. In FIG. 4, step S70 may be either executed or unexecuted. The automatic measurement is started after the pre-processing or step S150, alternatively during the processing of step S150.

In step S200, the overlapped portion of the photographed left and right images is a search area, the overlapped portion is shown in FIG. 14, and this area is divided into a plurality. Then, a point (search data block) near the center of each divided area is selected, and image correlation processing is executed so as to obtain the corresponding point of the left and right images to the selected point. This image correlation processing is carried out more surely by utilizing coarse-to-fine image correlation processing. Since searching is necessary only around the divided data block of the image, high-speed processing can be realized. A part having a low correlation coefficient found as a result of the correlation processing is eliminated, and a corresponding point having a high correlation coefficient is obtained (e.g., a correlation coefficient of 0.8 or higher can be set). Assuming that if no proper corresponding point is present among the points initially searched (data blocks), then the position of the point (search data block) is changed to the periphery thereof, and searching is executed. In this way, the three-dimensional coordinates of one representative point are obtained for each area. In the drawing, division is made into 4×4 areas. However, even if any way is employed for division, or the point of correlation processing is not set as a center, the point may be proper as long as it is present in the area.

In step S210, the result of measurement of step S200 is displayed on the display of the display unit 40. If there are no problems, then the process proceeds to a next flow. If there are any errors, shortages and the like, correction is made in this step. The correction is carried out by changing the position of the data block in the correction area. This work can be carried out automatically, manually, or semi-automatically. Alternatively, the process may proceed to the next step without any verification. However, if the verification is executed, later correction work will be facilitated.

Figure 15:
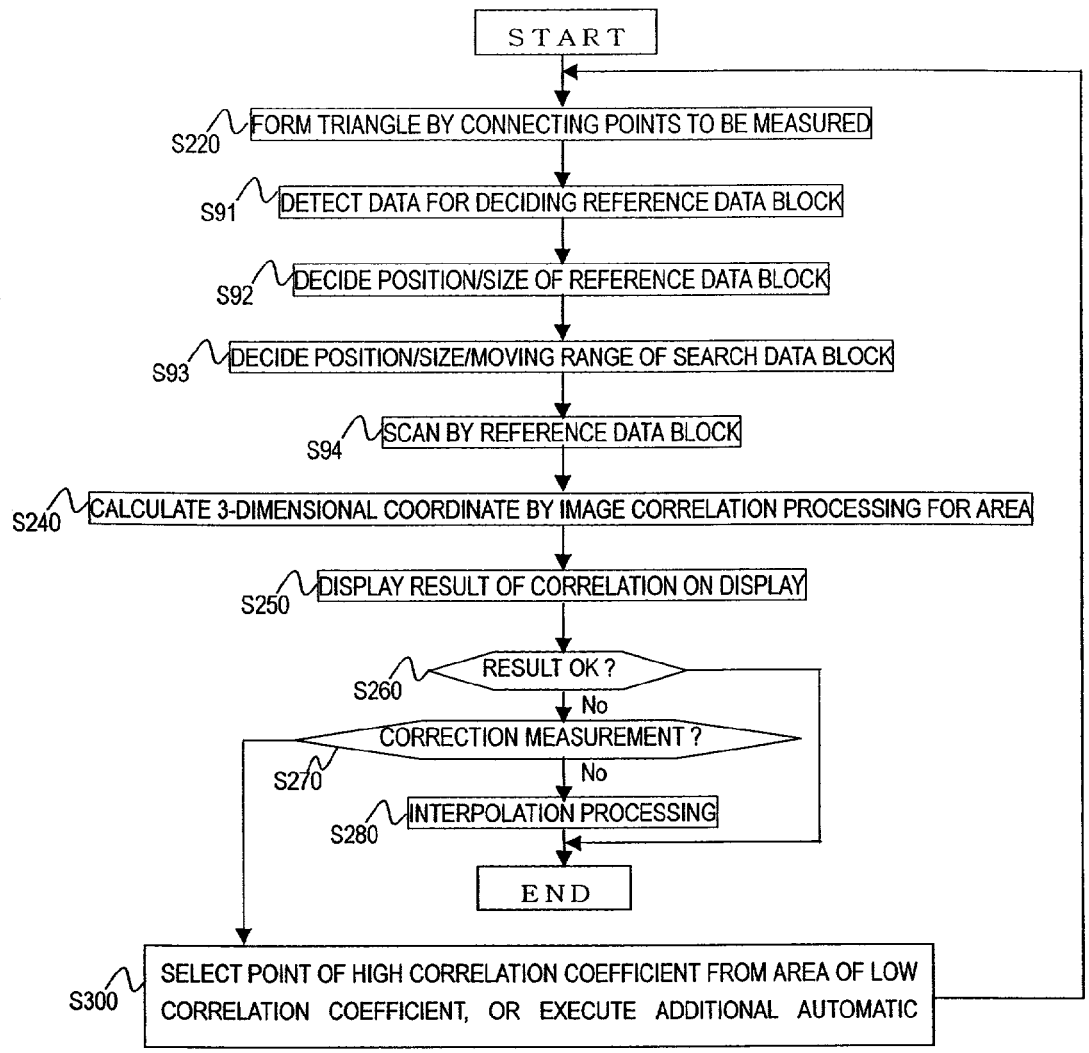
FIG. 15 is a flowchart of on-line automatic measurement.

Now, FIG. 15 is a flowchart of automatic measurement as a sequel of the foregoing. Steps herein are also automatically executed by a computer. After step S210 shown in FIG. 13, these steps are executed. In step S220, the points having been automatically measured for each area are connected to form a triangle. The connection may also be made by adding the points measured (formed into a graph) in step S40 or in step S70. Each processing of steps S90 to S260 and S280 is similar to that of each of steps S90 to S110 and S140. If the result of displaying is satisfactory, then the process is finished.

In step S270, based on the result of correlation displayed in the foregoing step, determination is made as to whether the additional automatic measurement is executed or not. If automatic correction measurement is carried out, the process proceeds to step S300. In step S300, after the execution of image correlation processing of step S240, a threshold is set among correlation numerical values, and a point including a correlation coefficient equal to the threshold or lower is eliminated from the target of additional selection. For the threshold, it may be fixed at 0.5 or lower, for example, from the beginning, or it may be decided depending on an object. Thus, a point having a relatively high correlation coefficient is selected or added for automatic measurement. The point selected for additional measurement can be set in the gravity center position of the triangle of the triangular area having a low correlation coefficient, or in the center (center of gravity) of the area having a low correlation coefficient. Then, coarse-to-fine image correlation processing is executed for a point of a high correlation coefficient near the above point or for its periphery. For further assurance, the processing may be carried out for both of them, and if both are found to be identical corresponding points, then such a point is selected as an additional point of measurement. If measurement is carried out by the survey instrument or the like, and if any unused point is present in the area, then this point may be automatically selected.

Next, description will be made of a method for obtaining the gravity center position of a triangle and the center of gravity of an area which has a low correlation coefficient.

First, with regard to the center of gravity of a triangle, for example if a correlation coefficient in the triangle E1 (C1, C2 and C5) of FIG. 10(a) is low, then the center of gravity C7 (see FIG. 11) of the triangle is obtained as a next point of measurement in the following manner. That is, assuming that the coordinate values of C1, C2 and C5 are respectively C1 ($X_1, Y_1, Z_1$), C2 ($X_2, Y_2, Z_2$), and C5 ($X_5, Y_5, Z_5$), X and Y coordinates for a next selection point of measurement C7 are obtained by the following expressions:

$$X=(X_1+X_2+X_5)/3 \quad (7)$$

$$Y=(Y_1+Y_2+Y_5)/3 \quad (8)$$

Alternatively, a center of gravity may be obtained from the distribution of areas which have low correlation coefficients shown in FIG. 10(b) (e.g., by the moment method). In the moment method, $x_g$ and $y_g$ obtained by the following expressions are used as an X and Y coordinate for selection points of additional measurement. The number of selection points of additional measurement may be one or plural.

$$x_g=\{\Sigma x*\{1-cor(x,y)\}\}/\Sigma\{1-cor(x,y)\} \quad (9)$$

$$y_g=\{\Sigma y*\{1-cor(x,y)\}\}/\Sigma\{1-cor(x,y)\} \quad (10)$$

($x_g$, $y_g$): coordinates of gravity center position, cor(x,y): correlation value on (x,y) coordinates Subsequently, the process moves to step S220. After step S220, the process is similar to that of the foregoing additional measurement flow, and the similar process is repeated after step S220 until a satisfactory result is obtained. If no improvement is made no matter how many times additional selection measurement is carried out, then the process proceeds to step S280. In step S280, for example, if any satisfactory result is not obtained for the area of E10 shown in FIG. 11 by any means, an elevation value is interpolated based on the plane equation of the plane E10 composed of the points of measurement C1, C2 and C7.

C: On-Line Measurement

Next, description will be made of "on-line measurement" included in the stereo image measuring device of the invention.

The invention is advantageous in that on-line measurement enables displaying, verification and correction to be easily performed on the site of measurement in real time, even without using the stereo monitor or the like. Thus, it is possible to shorten the total time of measurement, and perform sure and highly reliable three-dimensional measurement.

Now, detailed explanation will be made of the case of performing manual or semi-automatic measurement and the case of performing automatic measurement, based on the result of correlation.

C-1. Basic Measurement Flow

Figure 25:
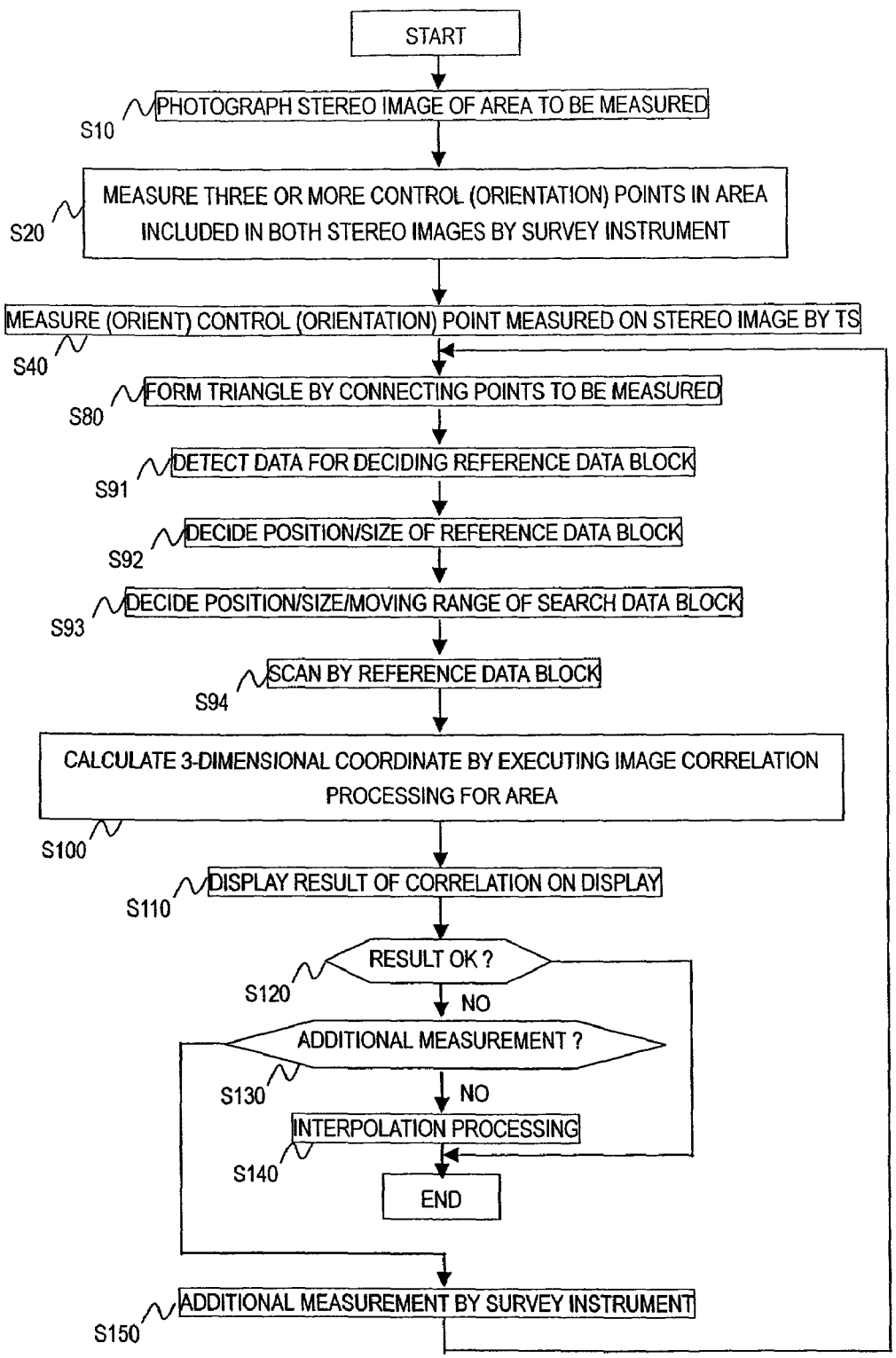
FIG. 25 is a flowchart of on-line measurement.

FIG. 25 is a flowchart of on-line measurement. The on-line measurement means, for example, measuring of an image on the site of measurement, and displaying of a three-dimensional image thereof. Among steps, steps similar to those of the foregoing off-line measurement will be omitted to an extent that description will not be redundant.

First, steps S10 and S20 are similar to those of the off-line measurement (see FIG. 2 and its description). Specifically, in step S10, first a stereo image of an area to be measured is photographed on site. Then, in step S20, by the survey instrument 1, three or more control (orientation) points are measured in an area included in both left and right stereophotographed images.

Then, in step S40, on the left and right images displayed on the display unit 40, the control (orientation) points measured by the survey instrument 1 are measured (correlated). In other words, in this example, the points C1 to C6 that have been measured by the survey instrument 1 are respectively subjected to orientation on the left and right images L and R.

In step S80, the points of measurement measured in step S40 are interconnected to form a triangle. The specific operation is similar to that of the foregoing off-line measurement (see FIG. 2 and its description).

The operations of steps S91 to S94, S100, S110, S120 and S140 are also similar to those of the foregoing off-line measurement (see FIG. 5, and its description). In step S120, if a displayed result is satisfactory, then the process is finished.

Now, additional measurement flow will be described. In step S130, if the displayed result is not satisfactory, then the process proceeds to step S150. In step S150, additional measurement is carried out by the survey instrument 1 for an area required for the measurement, e.g., an area having a low correlation coefficient. Here, if the measurement is to be made manually, the process moves to step S80.

C-2. Semi-Automatic Measurement

Figure 26:
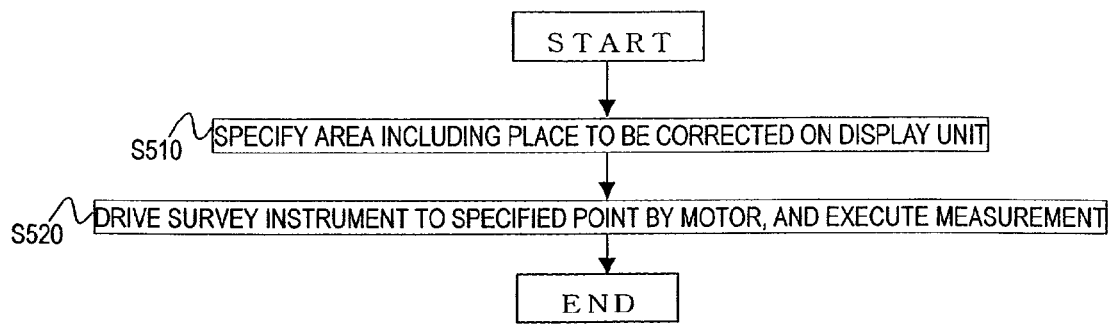
FIG. 26 is a flowchart of semi-automatic measurement.

The semi-automatic measurement is carried out by using an auto-tracking total station. FIG. 26 is a flowchart of semi-automatic measurement.

In step S510, for example as shown in FIG. 10(a), the E1 area having a low correlation coefficient is indicated by the pointing device (by a cursor in the case of a notebook computer, or a pen in the case of a pen computer). In step S520, position information regarding the x and y coordinates of the indicated point is transferred to the survey instrument 1 from the personal computer, and measurement is executed by driving the survey instrument 1 by a motor so as to measure the position. A measurement command is automatically sent from the personal computer to the survey instrument 1. Alternatively, a human operator may verify the position of the survey instrument and then issue a measurement command. If a place to be measured is an immeasurable point, another place measurable is searched in the area and measured. In the semi-automatic measuring work using such images, compared with the manual measurement, the process of measurement executed while tracking with the survey instrument can be omitted. Thus, considerably high work efficiency can be achieved. In other words, since an image tracked by the survey instrument reflects only the local area of an object, it will be very difficult and take time to track a place to be additionally measured. On the other hand, the operation according to the invention is simple, and can be carried out easily by anybody, because it needs only clicking on the image.

Subsequently, the process proceeds to step S80 of FIG. 25. The process of steps S80 and thereafter is similar to that of the foregoing (see FIG. 5 of the off-line measurement, and its description, or FIG. 25 of on-line measurement and its description).

C-3. Automatic Measurement

Automatic measurement can be carried out by utilizing an auto-tracking total station for the survey instrument.

Now, the automatic measurement will be described.

In step S150, measurement can be automated by executing the additional measurement in the following manner. After the execution of image correlation processing in S100, a threshold is set among correlation coefficients, and additional measurement is carried out for an area including a correlation coefficient equal to the threshold or lower. The threshold may be fixed, for example, at 0.5 from the beginning, or may be decided depending on an object. The area of measurement is a triangular area including a correlation coefficient equal to the threshold or lower. For example, in FIG. 10(a), the area of measurement is the area E1. The point to be additionally measured by the survey instrument may be set in the gravity center position of a triangle in the triangular area of a low correlation coefficient. Alternatively, it may be a point which has a lowest correlation coefficient in the area. Otherwise, it may be set in the center (center of gravity) of the area of low correlation coefficient. A method employed to obtain the gravity center position of the triangle and the center of gravity of the area of a low correlation coefficient is similar to that of the foregoing off-line measurement, and thus description thereof will be omitted.

Now, after the point of additional measurement has been decided, the survey instrument is controlled with respect to its coordinate value, and driven to execute measurement. If such a point of additional measurement proves to be immeasurable or difficult to be measured, then searching is carried out in the vicinity thereof, and measurement is executed. Other steps are executed by a computer, and thus a series of operations from step S80 to S150 are automated.

D. Correction by Graphic Displaying

Figure 16:
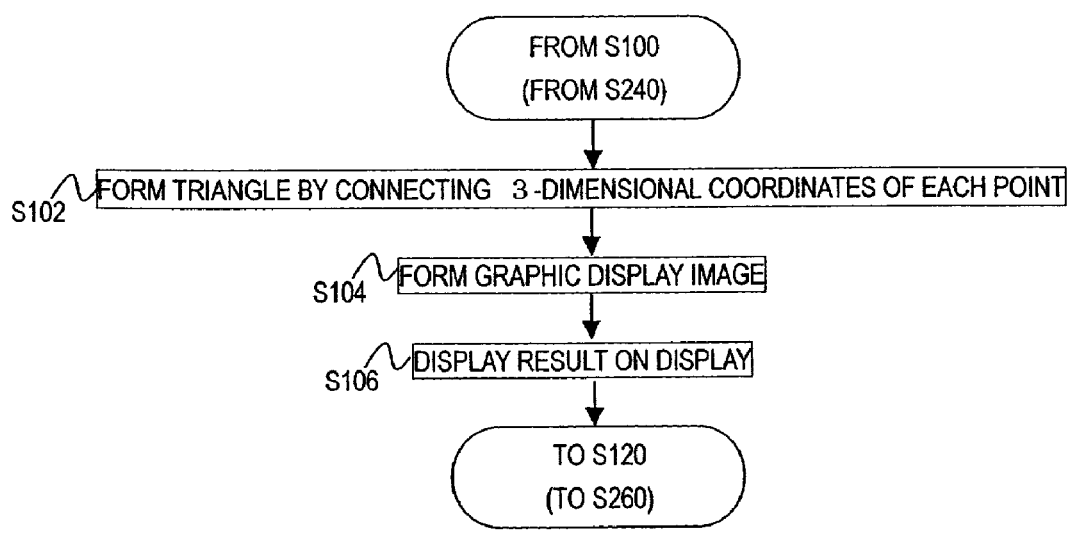
FIG. 16 is a flowchart of graphic displaying.

FIG. 16 is a flowchart of graphic displaying.

Now, description will be made of a method for verification and correction based on the result of correlation processing while executing graphic displaying. In other words, verification and correction can be realized by executing step S110 of FIG. 5 (or step S250 of FIG. 15) in the following manner.

First, in step S102, the three-dimensional coordinates of the obtained points are interconnected to form a triangle. In step S106, a graphic display image is formed based on each of the three-dimensional coordinates. When necessary, an image including the respective points of the three-dimensional coordinates and lines interconnecting such points, contour lines and a bird's-eye view having a surface or an image stuck on the triangle is formed. A view including an image stuck on the triangle may be an orthogonal projected image. If not necessary (visually determinable), then such processing may be omitted (e.g., one formed by connecting triangles may only be used). In fact, any kind is used as long as three-dimensional coordinates can be visually shown.

Such an image is displayed graphically to be properly determined on the stereo monitor, the personal computer monitor or the like. In step S106, the formed image is displayed on the display unit 40. For displaying, any methods may be used, which facilitate determination of image, depending on a situation, for example, triangles in an overlapped manner, correlation coefficients in an overlapped manner, or the like.

Figure 17:
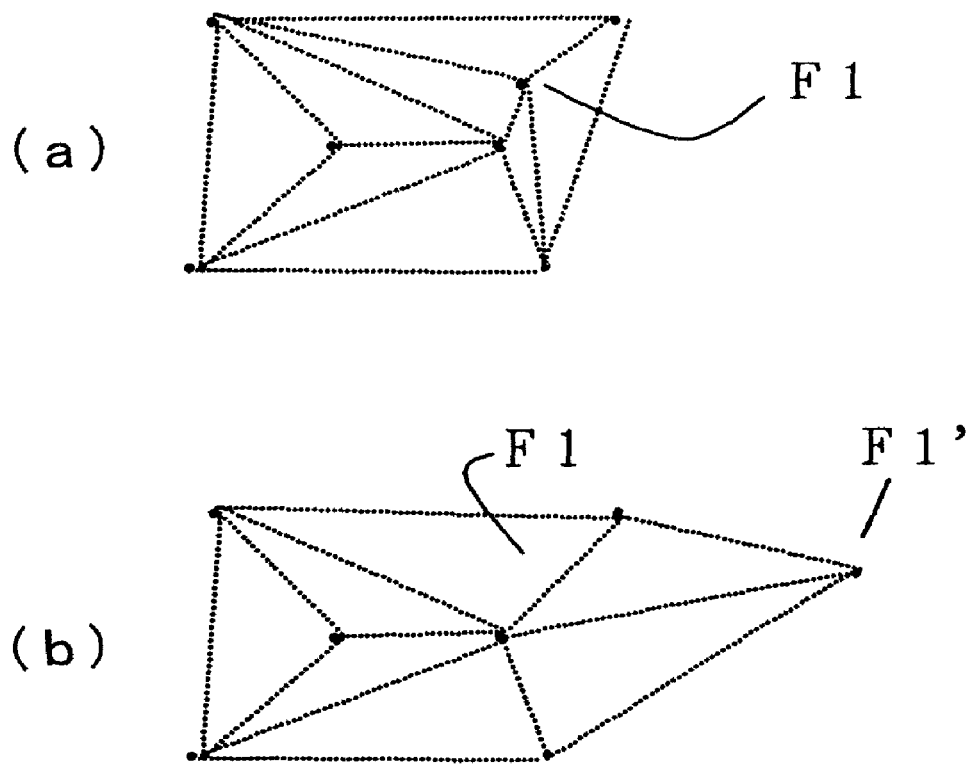
FIGS. 17(a) and 17(b) are views, each thereof illustrating graphic displaying.

For the bird's-eye view image or the like formed/displayed in steps S102 to S106, additional measurement can be carried out for an error or unnatural area. Each of FIGS. 17(a) and 17(b) illustrates graphic displaying. For example, even with merely the displaying of one formed by connecting triangles, if the image is different from an actual situation, a problem place can be determined from the displaying. For example, if an obtained three-dimensional coordinates are moved by mistake to F1' of FIG. 17(b) while its original point is F1 of FIG. 17(a), such an error can be clearly verified. Further, by displaying a surface or image stuck to FIG. 17(b), a difference from an actual situation can be more clearly emphasized. In addition, by displaying overlapping with correlation coefficient values, if the area of a low correlation coefficient coincides with a problem area, the area to be corrected can be made much clearer. In this case, it is only necessary to carry out manual or semi-automatic additional measurement for an area around the F1 of FIG. 17(b).

In the case of manual on-line measurement, the process moves to step S80. On the other hand, if the auto-tracking total station is used, semi-automatic measurement is enabled, and the process proceeds to step S110. In the semi-automatic measurement, as described above, for example as shown in FIGS. 17(a) and 17(b), processing thereafter is executed by indicating the error or unnatural area F1 with the cursor in the case of the notebook computer or the pen in the case of the pen computer.

E. Method for Setting a Search Area

Figure 18:
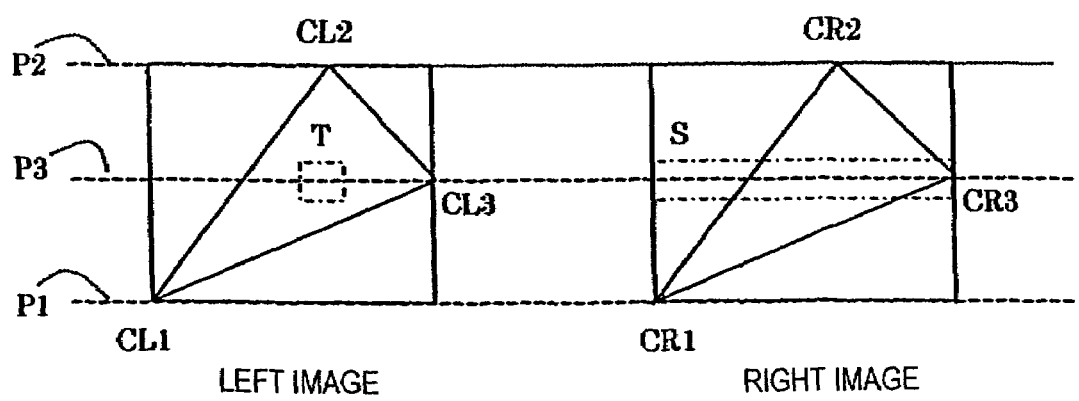
FIG. 18 is a view (1) illustrating setting of a search area.

Next, description will be made of the setting and scanning of a search area, a reference data block and a search data block by the search area setting unit 20. The setting method of a search area is exemplified in the following manner, and will be explained in order.
1. Set a search area: inclusion square
2. Set each data block based on the size of the search area
3. Set the position of each data block, and moving step according to a distance from a control point
4. Set the size of each data block according to a distance from the control point
5. Set the size of each data block based on a correlation value of the control point 1. Setting of Search Area: Inclusion Square FIG. 18 is a view (1) illustrating the setting of a search area.

Basically, with regard to the search areas of left and right images, mutual orientation has been carried out in step S30. Thus, vertical parallax has substantially been eliminated. In the drawing, the respective points CL1 and CR1 of the left and right images are present on the epipolar line P1; CL2 and CR2 on P2; and CL3 and CR3 on P3. As shown, if the points measured by the survey instrument form triangles of CL1, CL2 and CL3 in the left image, and of CR1, CR2 and CR3 in the right image, search areas are square areas including the respective triangles. Here, explanation is made of, for example, a case where the left image T in the area is set as a reference data block (template), and a position corresponding to this image is searched in the right image.

In this case, if the right image including a search data block is set as a search area S and vertical parallax has been eliminated, searching is executed on the epipolar line P3. If the elimination of the vertical parallax has been incomplete, then searching is executed also around the corresponding epipolar line. Such processing is carried out on each line in the inclusion square area including each control point. When set as shown, an area overlapped with an adjacent triangle is formed. However, a triangular area of other than the control point can be surely searched without any mistakes.

Figure 19:
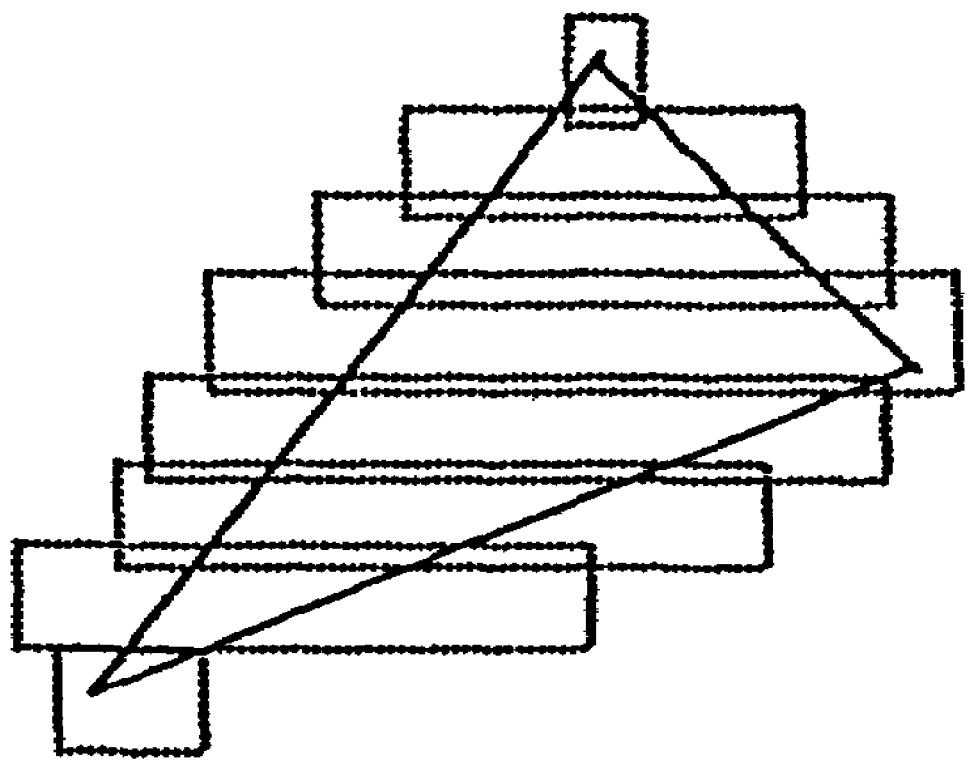
FIG. 19 is a view illustrating a search area.

Now, FIG. 19 illustrates a search area. The area inside the triangle of FIG. 18 may be set as a search area. However, it is uncertain whether a corresponding point other than the control point is in the triangular area or not. Accordingly, as shown in FIG. 19, it is efficient to set an area including the triangular area as a search area.

Figure 20:
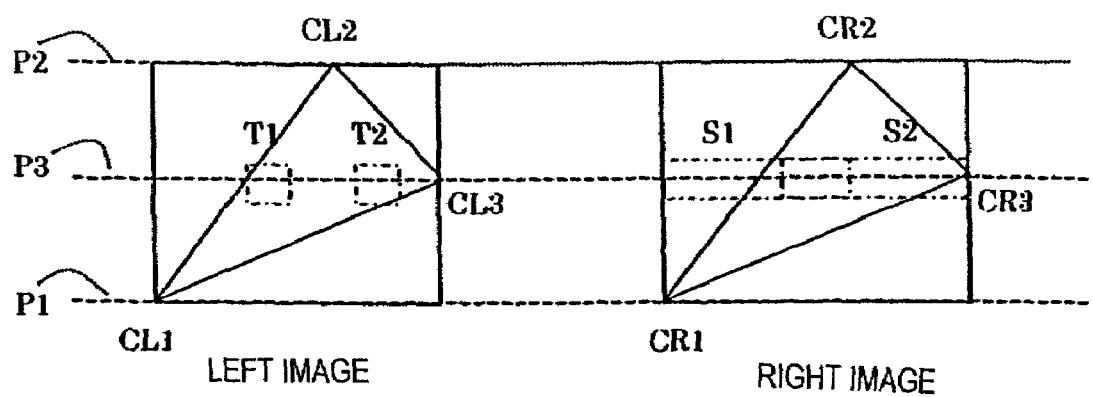
FIG. 20 is a view (2) illustrating setting of a search area.

FIG. 20 is a view (2) illustrating the setting of a search area.

As shown in FIG. 20, when searching is executed for the positions of search data blocks corresponding to respective reference data blocks (templates) T1 and T2, search areas S1 and S2 may be provided with respect to each of the overlapped templates in the search area on the line P3. Here, as an example, areas within a specified range from the centers of the reference data blocks T1 and T2 are set as search areas S1 and S2. Apparently therefore, the area nearer from each control point can be efficiently searched, and reliability can be enhanced by overlapping. A plurality of search areas may be set for each template. Further, search areas near CR1, CR2 and CR3, that are the corresponding points of the control points in the right image, may be set small, and gradually larger as they are separated farther away (a lowest or highest value may be set as occasion demands). In addition, the size of the search area with respect to the data block in the search area may be properly decided depending on the position, moving step or size of each data block described later. In this way, the range including the triangle can be efficiently searched.

2. Setting of each Data Block Based on Size of Search Area.

Figure 21:
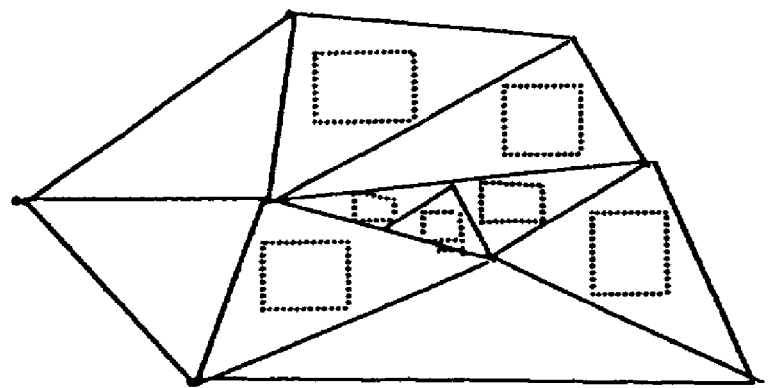
FIGS. 21(a) and 21(b) are views, each thereof illustrating specifying of a size of a search area.
Figure 21:
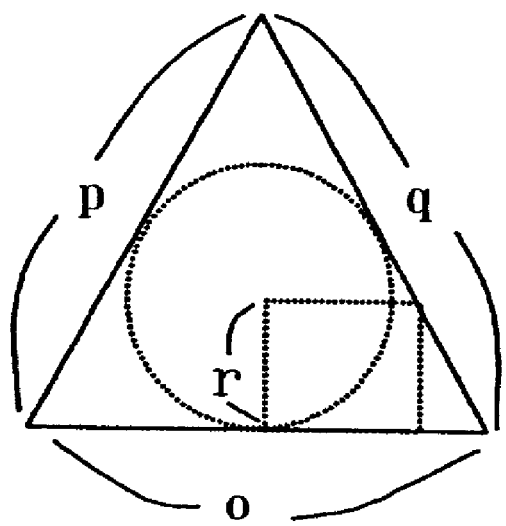

FIGS. 21(a) and 21(b) are views, each thereof illustrating the setting of the size of a search area.

As shown in FIG. 21(a), since the size of a triangle as a search area varies depending on the points of measurement, the size of a data block is set to match each triangular area. For example, each data block is decided on the basis of an inclusion square (see FIG. 18) set as a search area as described above. With respect to such a circumscribed square, the size of 1/k is set as a data block. A coefficient k maybe fixed beforehand, or properly decided according to accuracy to be required and the size of an area. Another example is shown in FIG. 21(b). In another example, a radius r of the inscribed circle of a triangle is obtained, and r, or ½, ⅓ or the like of r may be set as a data block size. The radius r is obtained by the following expression:

$$r=\sqrt{\{(s-o)(s-p)(s-q)/s\}} \quad (11)$$

$$\text{Here, } s=\tfrac{1}{2}(o+p+q) \quad (12)$$

The codes o, p and q respectively denote the lengths of three sides of the triangle, and these are calculated by measurement coordinates of the three points.

The method of obtaining the data block size is not limited to these, and any can be employed as long as it is suitable for the size of each triangle.

3. Setting of Position and Moving Step of each Data Block According to Distance from a Control Point FIGS. 22(a) and 22(b) are views (3), each thereof illustrating the setting of a search area.

3.1 Position of Search Data Block with Respect to Reference Data Block

Figure 22:
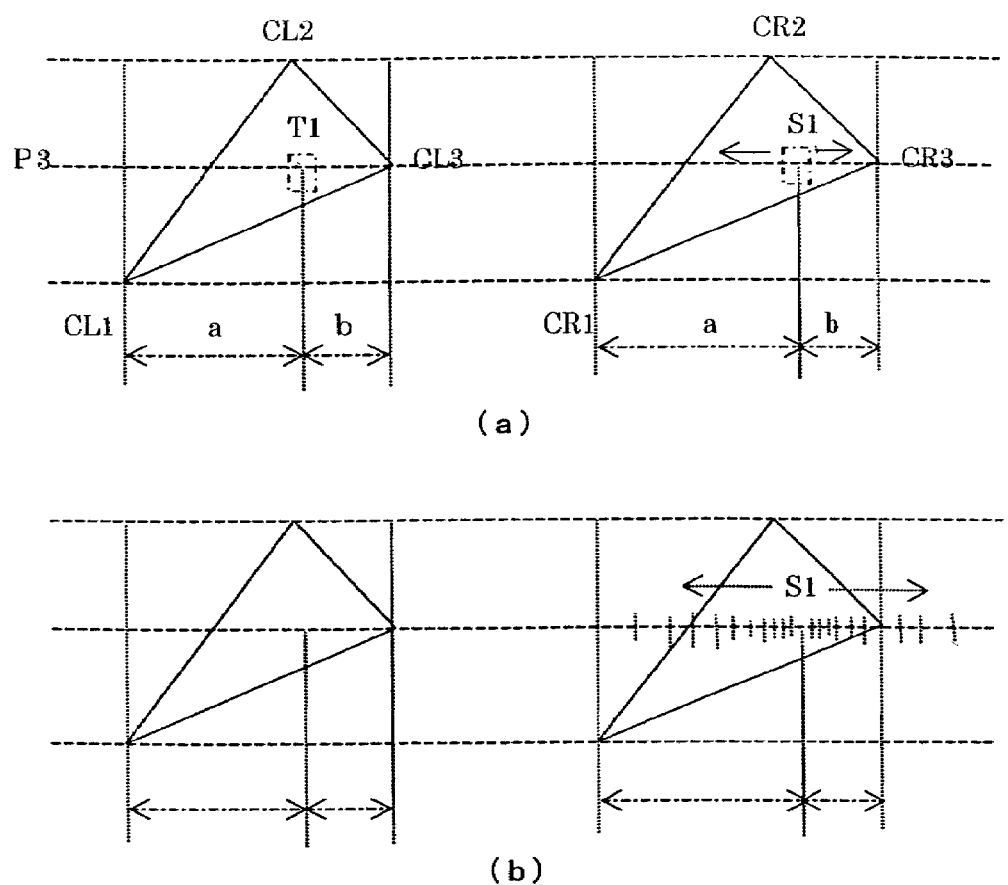
FIGS. 22(a) and 22(b) are views (3), each thereof illustrating setting of a search area.

As shown in FIG. 22(a), for example, if T1 on the left image is set as a template (reference data block) and the same image is to be searched from the right image, the position of T1 is searched within a predetermined range on the epipolar line p3 by setting a point S1 as the center of a search area, the point S1 being distributed at a distance of a and b from CR1 and CR3 on the epilpolar line P3, according to the distances a and b from the control points CL1 and CL3. Accordingly, since searching is executed in the vicinity of the S1 area estimated as the corresponding point of T1, processing can be carried out efficiently and within a short time.

3.2 Position and Moving Step in Search Area

For example, as shown in FIG. 22(b), searching is more efficiently carried out by making the moving step coarser as it is moved farther away toward both sides from the center of the search area set in 3.1. In other words, the moving step in a part near the center of the estimated area is made fine, the moving step in a part farther away is made coarse, thereby enabling efficient searching to be carried out. For the ratio of making coarser, coefficients may simply be set, or the ratio may be changed in proportion to a distance from the gravity center position of the triangle (see 3.2.1) or to a ratio of nearer one of the two control points (see 3.2.2).

3.2.1 Triangle Center of Gravity Method

Figure 23:
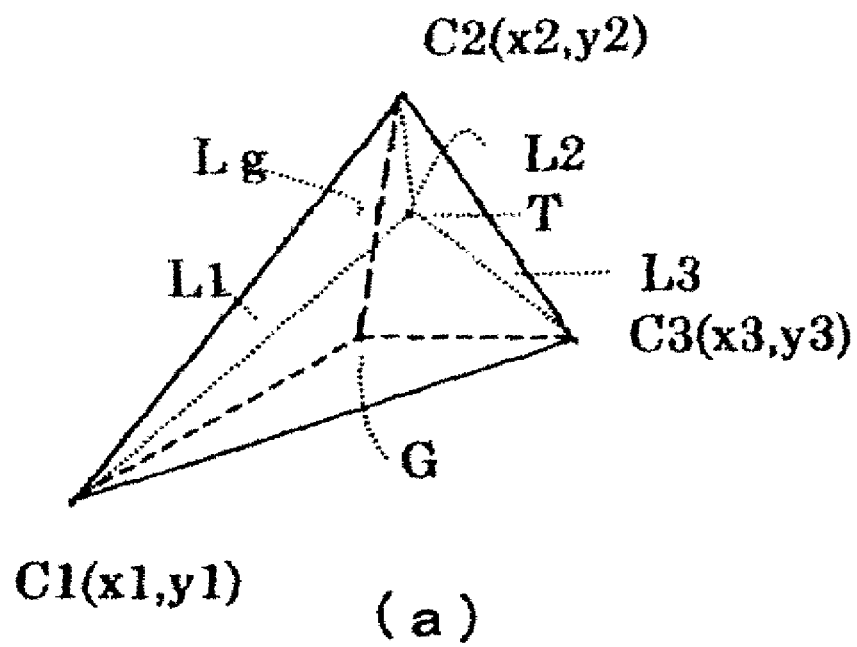
FIGS. 23(a) and 23(b) are views, each thereof illustrating a center of gravity of a triangle and a data block.
Figure 23:
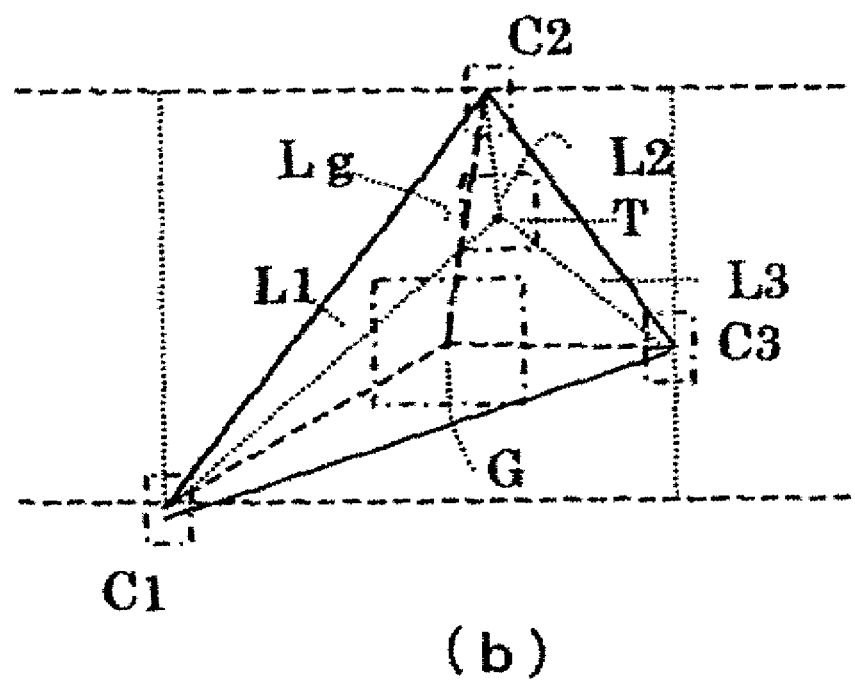

Now, description will be made of a method of deciding the position and the moving step of each data block based on the gravity center position of a triangle. FIGS. 23(a) and 23(b) are views, each thereof illustrating the center of gravity of a triangle and a data block.

As shown in FIG. 23(a), distances from the respective control points to the gravity center position G of the triangle are equal to one another. However, a distance from a point T other then the center of gravity to a certain control point may be shorter than that from the center of gravity to the control point. Thus, the position of the center of gravity is set as a maximum size of the data block, and a step is reduced as it is set closer to each control point. With C1 (x1, y1), C2 (x2, y2), C3 (x3, y3) and T (x, y), the distances of the respective points from T are as follows:

$$T-C1 : L1 = \sqrt{\{(x-x1)^2 + (y-y1)^2\}} \quad (13)$$

$$T-C2 : L2 = \sqrt{\{(x-x2)^2 + (y-y2)^2\}} \quad (14)$$

$$T-C3 : L3 = \sqrt{\{(x-x3)^2 + (y-y3)^2\}} \quad (15)$$

The distances of the respective points from the position G of the center of gravity are as follows:

$$G-C1 = G-C2 = G-C3 = Lg = \sqrt{\{(xg-x1)^2 + (yg-y1)^2\}} \quad (16)$$

A minimum one is obtained among the distances L1 to L3 calculated by the above expressions (13) to (15), a ratio between this distance and a distance toward the center of gravity is obtained, and then a moving step is decided. For example, if the maximum and minimum step sizes of the gravity center position G are respectively set as SGT and SMIN, then a step size at the point of a smallest distance L (L2 in FIG. 23(a)) from the template position is obtained as follows:

$$\text{Step size} = L/Lg \times (SGT - SMIN) + SMIN \quad (17)$$

3.2.2 Distance Method from Ratio of Two Nearer Control Points

Proportional distribution is made according to distances (of two nearer points) from the respective control points to T, and a step size is varied according to a distance to be searched. For example, a step size is decided based on the ratio between two smaller distances among the distances of the expressions (13) to (15). As shown in FIG. 23(a), with L2<L3<L1, the point of L2=L3 is set as SMAX, a maximum step, and the following is set:

$$\text{Step} = L2/L3 \times SMAX \quad (18)$$

The method for deciding the position and the moving step in the search area is not limited to the above.

4. Setting of Sizes of each Data Block and Search Area According to the Distance from a Control Point

4.1 Distances from the respective control points to an image position to be set as a data block are obtained, and a data block size is varied depending on the ratio of these distances. As shown in FIG. 23(b), distances from the respective control points to the gravity center position G of the triangle are equal to one another. However, a distance from a point T other than the center of gravity to a certain control point may be shorter than that from the center of gravity to the control point. Thus, the data block of the gravity center position is set as a maximum size, and an area is reduced as it is set closer toward each control point. With C1 (x1, y1), C2 (x2, y2), C3 (x3, y3) and T (x, y), the distances of the respective points from T are calculated by the foregoing expressions (13) to (15). The distances of the respective points from the position G of the center of gravity are also calculated by the foregoing expression (16). Then, a minimum one is picked up among the distances L1 to L3, the ratio between this distance and a distance toward the center of gravity is obtained, and then a data block size is decided.

For example, if the data block size at the gravity center position G is GT, and the data block size at the point of a minimum distance L (L2 in FIG. 23(b)) from the data block position is CT (data block of C2 in FIG. 23(b)), then the following is established:

$$\text{Data block size} = L/Lg \times (GT - CT) + CT \quad (19)$$

With regard to the vertical and horizontal widths of the data block, if vertical parallax has already been eliminated substantially by orientation processing, then the width in the vertical direction may be non-variable and fixed, while only the width in the horizontal direction may be varied. Accordingly, in the vicinity of the control point, a data block is set small assuming that a corresponding point is present nearby, and the presence of a corresponding point becomes uncertain as the position becomes farther away from the control point, thereby a data block at such a position can be enlarged to efficiently and surely obtain a corresponding point.

The method of deciding the size of the data block is not limited to the above. However, the above method assures the efficient and fast execution of searching.

5. Setting of Data Block Size Based on Correlation Value of a Control Point

Figure 24:
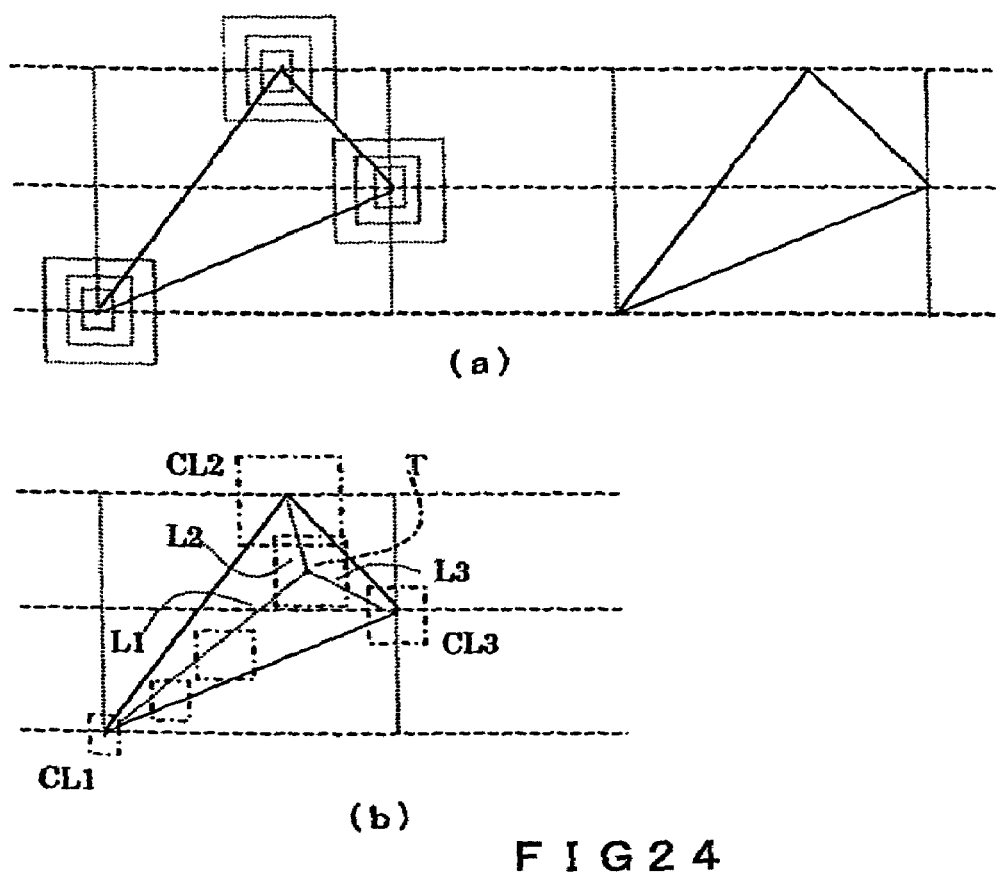
FIGS. 24(a) and 24(b) are views, each thereof illustrating a size of a data block.

FIGS. 24(a) and 24(b) are views, each thereof illustrating the size of each data block.

The vertexes of each triangle (control points) are points that have been measured, and thus correspondence has already been established. Accordingly, correlation coefficients are obtained for various template (reference data block) sizes at these respective points (as shown in FIG. 24(a)), and a template having a highest correlation coefficient is set as a template image. Based on the image of the obtained template size, searching is executed inside an area near each control point. The template size obtained at each control point is varied according to its position to be searched.

As an example, proportional distribution is made according to the sizes obtained at the respective control points and the distances (of two nearer points) from the respective control points, and each size is varied according to a distance to be searched (see FIG. 24(b)). If C1 (x1, y1), C2 (x2, y2), C3 (x3, y3), and a template T (x, y) are set, template sizes are obtained by the foregoing expressions (13) to (15). Accordingly, each template size is decided based on the ratio of the two smaller distances that have been obtained. For example, as shown in FIG. 24(b), with L2<L3<L1, the template sizes of CL2 and CL3 are divided by the ratio of L2:L3, and set as T sizes.

With regard to the vertical and horizontal widths of the data block, if vertical parallax has substantially been eliminated by orientation processing, the width in the vertical direction may be non-variable and fixed, while only the width in the horizontal direction may be varied.

According to the present invention, the execution of image correlation processing based on a triangle composed of control points eliminates the necessity of preparing a number of images different from one another in resolution. As a result, it is possible to carry out high-speed and highly reliable image correlation processing. Moreover, since measurement can be carried out also by using the survey instrument, the measurement can be more reliable and assured. As a result, even in a place where measurement has conventionally been impossible because it takes a long time, fast and easy measurement can be carried out.

The invention claimed is:

1. A stereo image measuring device comprising:
   a setting unit for setting regarding a stereo image including at least three or more points of measurement having position data thereof obtained, at least a part of the points of measurement as division points, and then setting a search area based on at least three division points, and then setting a search area based on at least three division points selected from a plurality of the set division points;
   an arithmetic operation unit for executing correlation processing for images of search areas corresponding to each other on the stereo image based on the search area set by the setting unit; and
   a measuring unit for measuring a coordinate of a point in a given position based on a result of the correlation executed by the arithmetic operation unit, and
   a display unit for displaying a stereo image,
   wherein the arithmetic operation unit prepares information regarding an area of measurement where a new point of measurement is required, according to the result of the correlation processing,
   the display unit executes predetermined displaying for an area where additional measurement is required in a graphic manner according to the information of the area of measurement prepared by the arithmetic operation unit, and position data is received when the position data of the new point of measurement in the area is measured by an external survey instrument based on the graphic displaying of the display unit.

2. The stereo image measuring device according to claim 1, wherein the measuring unit outputs the information of the area of measurement prepared by the arithmetic operation unit to an auto-tracking total station, causes the total station unit to measure a position of a new point of measurement in an area indicated by the area data, and then receives the measured position data.

3. The stereo image measuring device according to claim 1, wherein
   the setting unit selects points of measurement in an area where detailed division is required as new division points according to the information of the area of measurement prepared by the arithmetic operation unit, and then sets new search areas on the stereo image, and
   the arithmetic operation unit executes correlation processing for images of the new search areas.

4. The stereo image measuring device according to claim 1, wherein the setting unit sets, in each stereo image, an inclusion square including a triangle composed of three adjacent points selected from the obtained division points, alternatively from points of measurement, as a search area.

5. The stereo image measuring device according to claim 1, wherein the setting unit sets a reference data block in the search area of a first image of the stereo image, and a search data block in search areas of a second image of the stereo image, and then sets a position, alternatively a moving step of at least one of the reference data block and the search data block according to a distance from the division points.

6. The stereo image measuring device according to claim 1, wherein the setting unit sets a reference data block in the search areas of a first image of the stereo image, and a search data block in the search areas of a second image of the stereo image, and then sets a size of at least one of the reference data block and the search data block according to a distance from the division points.

7. The stereo image measuring device according to claim 1, wherein the setting unit sets a reference data block in the search areas of a first image of the stereo image, and a search data block in the search areas of a second image of the stereo image, sets a plurality of data blocks having different sizes in the vicinity of the division points obtains a result of correlation, and decides a size of at least one of the reference data block and the search data block according to the result of the correlation.

8. The stereo image measuring device according to claim 1, wherein the setting unit sets a reference data block in search areas of a first image of the stereo image, and a search data block in search areas of a second image of the stereo image, and then decides a size of the at least one of the reference data block and the search data block according to a size of search area.

9. The stereo image measuring device according to claim 1, wherein
   the setting unit sets a data block based on the set search area, the data block being smaller than the search area, and
   the arithmetic operation unit sets a block equivalent to the data block of one image of the stereo image as a template, scans the other image of the stereo image in a vertical position similar to that of the template, and searches a data block corresponding to the template based on a calculated correlation value.

10. A stereo image measuring method comprising:
    a setting step of setting, regarding a stereo image including at least three or more points of measurement having position data thereof obtained, at least a part of the points of measurement as division points, and then setting a triangle search area based on three division points selected from a plurality of the set division points;

an arithmetic operation step of executing correlation processing for images of search areas corresponding to each other on the stereo image based on the search area set by the setting unit; wherein information is prepared regarding an area of measurement where a new point of measurement is required according to the result of the correlation processing;

a measuring step of measuring a coordinate of a point in a given position from a result of the correlation executed by the arithmetic operation unit; and a displaying step for displaying the stereo image, wherein the area where additional measurement is required is displayed in a graphic manner, and wherein the position data is received when position data of a new point of measurement in the area is measured by an external survey instrument based on the graphic displaying executed in the displaying step.

* * * * *